United States Patent
Christensen et al.

(10) Patent No.: US 7,233,328 B2
(45) Date of Patent: Jun. 19, 2007

(54) FLEXIBLE AND MODIFIED MULTIRESOLUTION GEOMETRY CACHING BASED ON RAY DIFFERENTIALS

(75) Inventors: Per H. Christensen, Edmunds, WA (US); Julian Fong, Seattle, WA (US); David M. Laur, Seattle, WA (US); Dana Batali, Bainbridge Island, WA (US)

(73) Assignee: Pixar, Emeryville, CA (US)

( * ) Notice: Subject to any disclaimer, the term of this patent is extended or adjusted under 35 U.S.C. 154(b) by 174 days.

(21) Appl. No.: 11/033,482

(22) Filed: Jan. 10, 2005

(65) Prior Publication Data

US 2005/0179686 A1  Aug. 18, 2005

Related U.S. Application Data

(63) Continuation-in-part of application No. PCT/US2004/030560, filed on Sep. 17, 2004.

(60) Provisional application No. 60/602,779, filed on Aug. 18, 2004, provisional application No. 60/544,536, filed on Feb. 12, 2004.

(51) Int. Cl.
*G06T 15/00* (2006.01)
(52) U.S. Cl. ...................... 345/423; 345/440; 382/130
(58) Field of Classification Search ........ 345/419–424, 345/426–428, 440, 625, 640; 382/130
See application file for complete search history.

(56) References Cited

U.S. PATENT DOCUMENTS

| | | | |
|---|---|---|---|
| 5,742,293 A | 4/1998 | Koyamada et al. | 345/427 |
| 6,400,365 B1 | 6/2002 | Setoguichi et al. | 345/427 |
| 6,603,473 B1 * | 8/2003 | Litke et al. | 345/420 |
| 6,608,629 B2 | 8/2003 | Perry et al. | 345/619 |
| 6,658,142 B1 | 12/2003 | Kam et al. | 382/130 |
| 6,940,505 B1 * | 9/2005 | Savine et al. | 345/423 |

OTHER PUBLICATIONS

Amanatides, "Ray Tracing With Cones," In *Computer Graphics (Proc. SIGGRAPH '84)*, 1984, pp. 129-135.
Apodaca et al., Chapter 6: How Photorealistic Renderman Works, *Advanced RenderMan: Creating CGI for Motion Pictures*, Morgan Kaufmann; 1st edition (Dec. 8, 1999) pp. 152-155.

(Continued)

*Primary Examiner*—Phu K. Nguyen
(74) *Attorney, Agent, or Firm*—Townsend and Townsend and Crew LLP

(57) ABSTRACT

A method and apparatus for rendering a plurality of objects. The method includes receiving ray differential information associated with a ray, determining a first resolution associated with a first surface patch based on at least information associated with the ray and the first surface patch, processing information associated with the first resolution and a database, and determining whether a first geometry representation associated with the first surface patch tessellated at the first resolution is present in the database. The database is associated with a plurality of predetermined resolutions, and the first resolution is equal to one of the plurality of predetermined resolutions. At least one of the plurality of predetermined resolutions includes a first tessellation rate associated with a first dimension and a second tessellation rate associated with a second dimension. The first tessellation rate is different from the second tessellation rate.

30 Claims, 15 Drawing Sheets

OTHER PUBLICATIONS

Christensen et al., "Clustering for Glossy Global Illumination," *ACM Transactions on Graphics (TOG)*, vol. 16, No. 1, ACM, (Jan. 1997), pp. 2-33.

Christensen, "Importance for Ray Tracing," *Ray Tracing News*, 12(2), 1999. (www.acm.org/tog/resources/RTNews/html).

Christensen, "Industrial-Strength Global Illumination" presented in SIGGRAPH Course Note #27: *Global Illumination for Interactive Applications and High-Quality Animations*, ACM, San Diego, Jul. 27, 2003.

Christensen, "Multiresolution Geometry Caching for Ray Tracing and Global Illumination in Complex Scenes". Dagstuhl seminar "Hierarchical Methods in Computer Graphics". Schloss Dagstuhl, Wadern, Germany, Jun. 30, 2003. (Abstract Only).

Cook et al., "Distributed Ray Tracing," In *Computer Graphics(Proc. SIGGRAPH* 84), 1984, pp. 137-145.

Cook et al., "The Reyes Image Rendering Architecture," In *Computer Graphics (Proc. SIGGRAPH* 87), 1987, pp. 95-102..

Green et al., "Exploiting Coherency for Multiprocessor Ray Tracing," *IEEE Computer Graphics and Applications*, vol. 9, No. 6, (1989), pp. 12-26, 1989.

Gritz et al., "BMRT: A Global Illumination Implementation of the RenderMan Standard," *Journal of Graphics Tools*, vol. 1, No. 3 (1996), pp. 29-47.

Heckbert et al, "Beam Tracing Polygonal Objects," In *Computer Graphics (Proc. SIGGRAPH '84)*, 1984, pp. 119-127.

Igehy, "Tracing Ray Differentials," In *Computer Graphics (Proc. SIGGRAPH* 99), 1999, pp. 179-186.

Jensen, "Global Illumination Using Photon Maps." In *Rendering Techniques '96 (Proc. of the 7th Eurographics Workshop in Porto, Portugal)*, Springer-Verlag/Wien, New York, 1996, pp. 21-30.

Kajiya. "The Rendering Equation," In *Computer Graphics (Proc. SIGGRAPH* 86), vol. 20, No. 4 (Aug. 1986), pp. 143-150.

Kato, "The Kilauea Massively Parallel Ray Tracer," Chapter 8 in Chalmers et al. eds, *Practical Parallel Rendering*, A K Peters, MA, (2002), pp. 249-327.

Kay et al., "Ray Tracing Complex Scenes," in *Computer Graphics (Proc. SIGGRAPH '86)*, vol. 20, No. 4 (Aug. 1986), pp. 269-278.

Kobbelt et al., "Ray Tracing of Subdivision Surfaces," In *Rendering Techniques '98 (Proc. 9th Eurographics Workshop in Vienna, Austria)*, Springer-Verlag Wien, New York 1998, pp. 69-80.

Landis. "Production-Ready Global Illumination," In *SIGGRAPH 2002* course note #16, (2002), pp. 87-102.

Martin et al., "Practical Ray Tracing Of Trimmed NURBS Surfaces," *Journal of Graphics Tools*, vol. 5, No. 1, (2000), pp. 27-52.

Parker et al., "Interactive Ray Tracing," In *Symposium on Interactive 3D Graphics*, 1999, pp. 119-126.

Pharr et al., "Geometry Caching For Ray-Tracing Displacement Maps," In *Rendering Techniques '96 (Proc. of the 7th Eurographics Workshop in Porto, Portugal)*, Springer-Verlag/Wien, New York, 1996.

Pharr et al., "Rendering Complex Scenes With Memory-Coherent Ray Tracing," In *Computer Graphics* (Proc. SIGGRAPH '97), 1997, pp. 101-108.

Pixar Animation Studios, *RenderMan Interface Specification, version 3.2*, (Jul. 2000), retrieved from the Internet (online): <<https://renderman.pixar.com/products/rispec/rispec_pdf/RISpec3_2.pdf>> on Aug. 17, 2005, 226 pages total.

Rushmeier et al., "Geometric Simplification for Indirect Illumination Calculations," In *Proc. Graphics Interface '93*, Toronto, Ontario, (May 1993), pp. 227-236.

Sherstyuk, "Fast Ray Tracing of Implicit Surfaces," *Computer Graphics Forum*, vol. 18, No. 2, (1999), pp. 139-147.

Shinya et al, "Principles and Applications of Pencil Tracing," In *Computer Graphics (Proc. SIGGRAPH '87)*, vol. 21, No. 4 (Jul. 1987), pp. 45-54.

Shirley et al., "Monte Carlo Techniques for Direct Lighting Calculations," *ACM Transactions on Graphics*, vol. 15, No. 1, (Jan. 1996), pp. 1-36.

Slusallek et al., "Using Procedural RenderMan Shaders for Global Illumination," In *Computer Graphics Forum (Proc. Eurographics '95)*, 1995, pp. 311-324.

Smits et al,. "A Clustering Algorithm For Radiosity In Complex Environments," In *Computer Graphics (Proc. SIGGRAPH '94)*, 1994, pp. 435-442.

Smits et al., "Direct Ray Tracing of Displacement Mapped Triangles," In *Rendering Techniques 2000 (Proc. 11th Eurographics Workshops in Brno, Czech Republic)*, Springer-Verlag/Wien, New York, (Jun. 2000), pp. 307-318.

Stollnitz et al., *Wavelets for Computer Graphics: Theory and Applications*, Morgan Kaufmann, San Francisco, (1996) pp. 111, 112, 164, 165.

Suykens et al., "Path Differentials and Applications," In *Rendering Techniques 2001 (Proc. 12th Eurographics Workshop in London, United Kingdom)*, Springer-Verlag/Wien, New York, (Jun. 2001), pp. 257-268.

Wald et al, "Interactive Rendering With Coherent Ray Tracing," In *Computer Graphics Forum (Proc. Eurographics)*, vol. 20, No. 3 (2001), pp. 153-164.

Wald et al., "Interactive Distributed Ray Tracing of Highly Complex Models," In *Rendering Techniques 2001 (Proc. 12th Eurographics Workshop in London, United Kingdom)*, Springer-Verlag/Wien, New York, (Jun. 2001), pp. 277-288.

Wald et al., "Interactive Global Illumination Using Fast Ray Tracing," In *Rendering Techniques 2002 (Proc. 13th Eurographics Workshop on Rendering)*, 2002, pp. 15-24.

Ward et al., "Adaptive Shadow Testing For Ray Tracing," In *Proc. 2nd Eurographics Workshop on Rendering*, Springer-Verlag/Wien (1991), pp. 11-20.

Ward et al., "Irradiance Gradients," In *Proc. 3rd Eurographics Workshop on Rendering*, 1992, pp. 85-98.

Ward et al., "The RADIANCE Lighting Simulation and Rendering System," in Computer Graphics (*Proc. SIGGRAPH '94*), 1994, pp. 459-472.

Whitted, "An Improvement Illumination Model for Shaded Display," Communications of the ACM, vol. 23, No. 6 (Jun. 1980), pp. 343-349.

Williams, "Pyramidal Parametrics," In *Computer Graphics (Proc. SIGGRAPH '83)*, 1983, pp. 1-11.

Zhukov et al., "An Ambient Light Illumination Model", In *Rendering Techniques '98 (Proc. 9th Eurographics Workshop in Vienna Austria)*, Springer-Verlag/Wien, New York (1998), pp. 45-55.

\* cited by examiner

1000

FLEXIBLE AND MODIFIED MULTIRESOLUTION GEOMETRY CACHING BASED ON RAY DIFFERENTIALS

CROSS-REFERENCES TO RELATED APPLICATIONS

This application claims priority to U.S. Provisional No. 60/544,536 filed Feb. 12, 2004 and U.S. Provisional No. 60/602,779 filed Aug. 18, 2004, and is a continuation-in-part of International application No. PCT/US2004/030560 with an international filing date of Sep. 17, 2004, all of which are incorporated by reference herein for all purposes.

The following three commonly-owned co-pending applications, including this one, are being filed concurrently and the other two are hereby incorporated by reference in their entirety for all purposes:

1. U.S. patent application Ser. No. 11/033,482, in the name of Per H. Christensen, Julian Fong, David M. Laur, and Dana Batali, titled, "Flexible and Modified Multiresolution Geometry Caching Based on Ray Differentials.";

2. U.S. patent application Ser. No. 11/033,042, in the name of Per H. Christensen, Julian Fong, David M. Laur, and Dana Batali, titled, "Multiresolution Geometry Caching Based on Ray Differentials with Modifications,"; and 3. U.S. patent application Ser. No. 11/033,445, now U.S. pat. No. 7,196,704, issued Mar. 27, 2007, in the name of Per H. Christensen, Julian Fong, David M. Laur, and Dana Batali, titled, "Multiresolution Geometry Caching Based on Ray Differentials with Stitching,".

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to computer animation techniques. More particularly, the invention provides a method and system for multiresolution geometry caching based on ray differentials. Merely by way of example, the invention is described as it applies to a ray tracing process, but it should be recognized that the invention has a broader range of applicability.

Throughout the years, movie makers have often tried to tell stories involving make-believe creatures, far away places, and fantastic things. To do so, they have often relied on animation techniques to bring the make-believe to "life." Two of the major paths in animation have traditionally included drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw or paint animated images onto transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and "Clash Of The Titans" (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer graphics (CG) industry was Pixar. Pixar developed both computing platforms specially designed for CG, and rendering software now known as RenderMan®. RenderMan® was particularly well received in the CG industry and recognized with two Academy Awards®. RenderMan® software is used to convert graphical specifications of objects and convert them into one or more images. This technique is known generally in the industry as rendering.

Pixar pioneered techniques of scanline rendering to render complex scenes. With scanline rendering, geometric complexity is reduced by dividing a scene into separate tiles and by rendering one image tile at a time. As a result, only visible objects within a tile are tessellated. To account for reflection and refraction effects, reflection and refraction maps are used. Using scanline techniques, color bleeding effects of global illumination are simulated by laboriously placing colored light sources in the scene. These lights are sometimes called "bounce lights." The addition of ray tracing techniques to scanline rendering techniques is straightforward as long as the rays intersect geometry in a coherent fashion. Such rays are often called coherent rays. Specular reflection and refraction rays from flat or slightly curved surfaces are usually coherent rays. Furthermore, shadow rays from point lights, spot lights, directional lights, and small area lights are typically also coherent rays. Accordingly, it has been possible to combine ray tracing and scanline rendering.

For general path tracing, there is often much less geometric coherency than for classic ray tracing. This obstacle may be overcome by reordering rays. Unshot rays may be inserted into a pool of rays. For example, the image contribution of each ray is computed before the ray is inserted in the pool, and this weight as well as the ultimate pixel position of the ray color is stored with the pending ray. When sufficiently many rays are waiting to be intersection tested against an object, the geometry is read in, tessellated if not already in tessellated form, and inserted into the cache. This way, scenes can be rendered that are ten times larger than the geometry cache.

One common method to speed up rendering is to simplify geometry that only covers a small part of the image. For example, a coarse geometry representation is used for computing an approximate radiosity solution. Clusters of complex geometry can be substituted by boxes with similar reflective and transmissive properties. During rendering, rays for computing diffuse interreflection are intersected with the original geometry near the ray origins and with the boxes further away. A user-defined distance threshold can be used to switch between the two representations. Additionally, clustered geometry can be used for efficient light transport between distant groups of objects. Instead of computing light transport between all pairs of objects, the far-field radiance of one cluster of objects is computed, the light is transported to the other cluster, and then "pushed down" to its individual surfaces.

Some research has also been performed to speed up direct ray tracing without tessellation. For example, only the high-level description of the objects and a spatial acceleration data structure need to fit in memory. The high-level description may include the control points of NURBS patches or top-level subdivision meshes. These methods appear suitable for ray tracing of complex scenes, at least from a memory usage standpoint.

Additionally, certain conventional ray tracers use parallel ray tracing techniques. For example, many processors can be used on a shared memory computer to obtain interactive frame rates. For good performance, scenes need to fit in the rather small on-chip cache on each processor. In another example, a cluster of PCs is used for interactive ray tracing of complex scenes up to 50 million triangles. Ray coherency ensures that each PC only needs parts of the scene. In simpler scenes, indirect illumination can also be rendered. For example, 20–25 shadow rays per pixel are shot to virtual point lights generated by random walks, and indirect illumination is averaged between neighbor pixels to reduce noise. In yet another example, complex scenes can be handled by dividing the objects between a cluster of PCs. Each surface is tessellated and assigned to a processor. Packets of rays to be tested for intersection are communicated between the processors. After all rays have been shot by a shader, the shader is inserted into a pool of suspended shaders. When all those rays have been traced and shaded, the shader is taken out of the pool and its computation continues.

Moreover, some conventional ray tracers use ray differential techniques. Beam tracing, cone tracing, and pencil tracing trace bundles of light paths instead of infinitely thin rays. General intersection, reflection, and refraction calculations may be difficult since each bounce can split the light beam, light cone, or light pencil. As an improvement, a ray differential method traces single rays, but keeps track of the difference between each ray and two real or imaginary "neighbor" rays. These differences give an indication of the cone or beam size that each ray represents. The curvature at ray-surface intersection points determines how those ray differentials are propagated at specular reflection and refraction. For example, if a ray hits a highly curved, convex surface, the specularly reflected ray may have a large differential, which represents highly diverging neighbor rays. Ray differentials can help in texture antialiasing since they may indicate the best texture filter size, but they often do not help in aliasing of ray hits in terms of visibility: the ray either hits an object or not.

The ray differentials may be generalized for glossy and diffuse reflections. For example, the ray differential corresponds to a fraction of the hemisphere for distribution ray tracing of diffuse reflection. The more rays are traced from the same point, the smaller the fraction becomes. For path tracing of diffuse reflection, the "path differential" is a global value $^{2d}\sqrt{N}$, where d is the ray depth and N is the total number of rays that reach that depth. Distribution ray tracing usually gives smaller, more accurate ray differentials than path tracing.

Conventional ray tracing techniques have limited ability to efficiently compute ray tracing and global illumination in very complex scenes. Hence it is highly desirable to improve techniques for ray tracing.

BRIEF SUMMARY OF THE INVENTION

The present invention relates in general to computer animation techniques. More particularly, the invention provides a method and system for multiresolution geometry caching based on ray differentials. Merely by way of example, the invention is described as it applies to a ray tracing process, but it should be recognized that the invention has a broader range of applicability.

According to one embodiment of the present invention, a method for rendering a plurality of objects includes receiving ray differential information associated with a ray, determining a resolution associated with a surface patch based on at least information associated with the ray and the surface patch, generating a geometry representation based on at least information associated with the surface patch and the resolution, and determining whether the ray and the surface patch intersect based on at least information associated with the ray and the geometry representation. The determining a resolution includes processing information associated with the ray and the surface patch, determining a ray differential based on at least information associated with the ray and the surface patch, processing information associated with the ray differential and the surface patch, and determining the resolution based on at least information associated with the ray differential and the surface patch.

According to another embodiment of the present invention, a method for rendering a plurality of objects includes receiving ray information associated with a ray, determining a first resolution associated with a first surface patch based on at least information associated with the ray and the first surface patch, and processing information associated with the first resolution and a database. Additionally, the method includes determining whether a first geometry representation associated with the first surface patch tessellated at the first resolution is present in the database, and if the first geometry representation is not present, generating the first geometry representation based on at least information associated with the first surface patch and the first resolution. Moreover, the method includes determining whether the ray and the first surface patch intersect based on at least information associated with the ray and the first geometry representation. The determining a first resolution includes processing information associated with the ray and the first surface patch, determining a first ray differential based on at least information associated with the ray and the first surface patch, processing information associated with the first ray differential and the first surface patch, and determining the first resolution based on at least information associated with the first ray differential and the first surface patch.

According to yet another embodiment of the present invention, a computer program product including a computer-readable medium including instructions for rendering a plurality of objects is provided. The computer-readable medium includes one or more instructions for receiving ray differential information associated with a ray, one or more instructions for determining a resolution associated with a surface patch based on at least information associated with the ray and the surface patch, one or more instructions for generating a geometry representation based on at least information associated with the surface patch and the resolution, and one or more instructions for determining whether the ray and the surface patch intersect based on at least information associated with the ray and the geometry representation. The one or more instructions for determining a resolution includes one or more instructions for processing information associated with the ray and the surface patch, one or more instructions for determining a ray differential based on at least information associated with the ray and the surface patch, one or more instructions for processing information associated with the ray differential and the surface patch, and one or more instructions for determining the resolution based on at least information associated with the ray differential and the surface patch.

According to yet another embodiment of the present invention, a computer program product including a computer-readable medium including instructions for rendering a plurality of objects is provided. The computer-readable medium includes one or more instructions for receiving ray information associated with a ray, one or more instructions for determining a first resolution associated with a first surface patch based on at least information associated with the ray and the first surface patch, one or more instructions for processing information associated with the first resolution and a database, and one or more instructions for determining whether a first geometry representation associated with the first surface patch tessellated at the first resolution is present in the database. Additionally, the computer-readable medium includes one or more instructions for if the first geometry representation is not present, generating the first geometry representation based on at least information associated with the first surface patch and the first resolution, and one or more instructions for determining whether the ray and the first surface patch intersect based on at least information associated with the ray and the first geometry representation. The one or more instructions for determining a first resolution includes one or more instructions for processing information associated with the ray and the first surface patch, one or more instructions for determining a first ray differential based on at least information associated with the ray and the first surface patch, one or more instructions for processing information associated with the first ray differential and the first surface patch, and one or more instructions for determining the first resolution based on at least information associated with the first ray differential and the first surface patch.

According to yet another embodiment of the present invention, a system for rendering a plurality of objects, the system includes a processing system configured to receive ray differential information associated with a ray, determine a resolution associated with a surface patch based on at least information associated with the ray and the surface patch, generate a geometry representation based on at least information associated with the surface patch and the resolution, and determine whether the ray and the surface patch intersect based on at least information associated with the ray and the geometry representation. The determine a resolution includes process information associated with the ray and the surface patch, determine a ray differential based on at least information associated with the ray and the surface patch, process information associated with the ray differential and the surface patch, and determine the resolution based on at least information associated with the ray differential and the surface patch. p According to yet another embodiment of the present invention, a system for rendering a plurality of objects includes a processing system configured to receive ray information associated with a ray, determine a first resolution associated with a first surface patch based on at least information associated with the ray and the first surface patch, process information associated with the first resolution and a database, and determine whether a first geometry representation associated with the first surface patch tessellated at the first resolution is present in the database. Additionally, the processing system is configured to if the first geometry representation is not present, generate the first geometry representation based on at least information associated with the first surface patch and the first resolution. Moreover, the processing system is configured to determine whether the ray and the first surface patch intersect based on at least information associated with the ray and the first geometry representation. The determine a first resolution includes process information associated with the ray and the first surface patch, determine a first ray differential based on at least information associated with the ray and the first surface patch, process information associated with the first ray differential and the first surface patch, and determine the first resolution based on at least information associated with the first ray differential and the first surface patch.

According to yet another embodiment of the present invention, a method for rendering a plurality of objects includes receiving ray differential information associated with a ray, determining a first resolution associated with a first surface patch based on at least information associated with the ray and the first surface patch, processing information associated with the first resolution and a database, and determining whether a first geometry representation associated with the first surface patch tessellated at the first resolution is present in the database. Additionally, the method includes if the first geometry representation is not present, generating the first geometry representation based on at least information associated with the first surface patch and the first resolution. Moreover, the method includes determining whether the ray and the first surface patch intersect based on at least information associated with the ray and the first geometry representation. The determining a first resolution includes processing information associated with the ray and the first surface patch, determining a first ray differential based on at least information associated with the ray and the first surface patch, processing information associated with the first ray differential and the first surface patch, and determining the first resolution based on at least information associated with the first ray differential and the first surface patch. The database is associated with a plurality of predetermined resolutions, and the first resolution is equal to one of the plurality of predetermined resolutions. At least one of the plurality of predetermined resolutions includes a first tessellation rate associated with a first dimension and a second tessellation rate associated with a second dimension. The first tessellation rate is different from the second tessellation rate.

According to yet another embodiment of the present invention, a computer program product including a computer-readable medium including instructions for rendering a plurality of objects. The computer-readable medium includes one or more instructions for receiving ray differential information associated with a ray, one or more instructions for determining a first resolution associated with a first surface patch based on at least information associated with the ray and the first surface patch, one or more instructions for processing information associated with the first resolution and a database, and one or more instructions for determining whether a first geometry representation associated with the first surface patch tessellated at the first resolution is present in the database. Additionally, the computer-readable medium includes one or more instructions for if the first geometry representation is not present, generating the first geometry representation based on at least information associated with the first surface patch and the first resolution. Moreover, the computer-readable medium includes one or more instructions for determining whether the ray and the first surface patch intersect based on at least information associated with the ray and the first geometry representation. The one or more instructions for determining a first resolution includes one or more instructions for processing information associated with the ray and the first surface patch, one or more instructions for determining a first ray differential based on at least information associated with the ray and the first surface patch, one or more instructions for processing information associated with the first ray differential and the first surface patch, and one or more instructions for determining the first resolution based on at least information associated with the first ray differential and the first surface patch. The database is associated with a plurality of predetermined resolutions, and the first resolution is equal to one of the plurality of predetermined resolutions. At least one of the plurality of predetermined resolutions includes a first tessellation rate associated with a first dimension and a second tessellation rate associated with a second dimension. The first tessellation rate is different from the second tessellation rate.

According to yet another embodiment of the present invention, a system for rendering a plurality of objects includes a processing system. The processing system is configured to receive ray differential information associated with a ray, determine a first resolution associated with a first surface patch based on at least information associated with the ray and the first surface patch, process information associated with the first resolution and a database, and determine whether a first geometry representation associated with the first surface patch tessellated at the first resolution is present in the database. Additionally, the processing system is configured-to if the first geometry representation is not present, generate the first geometry representation based on at least information associated with the first surface patch and the first resolution. Moreover, the processing system is configured to determine whether the ray and the first surface patch intersect based on at least information associated with the ray and the first geometry representation. The determine a first resolution includes process information associated with the ray and the first surface patch, determine a first ray differential based on at least information associated with the ray and the first surface patch, process information associated with the first ray differential and the first surface patch, and determine the first resolution based on at least information associated with the first ray differential and the first surface patch. The database is associated with a plurality of predetermined resolutions, and the first resolution is equal to one of the plurality of predetermined resolutions. At least one of the plurality of predetermined resolutions includes a first tessellation rate associated with a first dimension and a second tessellation rate associated with a second dimension. The first tessellation rate is different from the second tessellation rate.

According to yet another embodiment of the present invention, a method for rendering a plurality of objects includes receiving ray differential information associated with a ray, determining a first resolution associated with a first surface patch based on at least information associated with the ray and the first surface patch, processing information associated with the first resolution and a database, and determining whether a first geometry representation associated with the first surface patch tessellated at the first resolution is present in the database. Additionally, the method includes if the first geometry representation is not present, generating the first geometry representation based on at least information associated with the first surface patch and the first resolution. Moreover, the method includes determining whether the ray and the first surface patch intersect based on at least information associated with the ray and the first geometry representation. The determining a first resolution includes processing information associated with the ray and the first surface patch, determining a first ray differential based on at least information associated with the ray and the first surface patch, processing information associated with the first ray differential and the first surface patch, and determining the first resolution based on at least information associated with the first ray differential and the first surface patch. The first surface patch is associated with a second resolution. The generating the first geometry representation based on at least information associated with the first surface patch and the first resolution includes if the first resolution is higher than the second resolution, determining the first geometry representation by tessellating the first surface patch at the second resolution and storing the first geometry representation into the database.

According to yet another embodiment of the present invention, a computer program product including a computer-readable medium including instructions for rendering a plurality of objects. The computer-readable medium includes one or more instructions for receiving ray differential information associated with a ray, one or more instructions for determining a first resolution associated with a first surface patch based on at least information associated with the ray and the first surface patch, one or more instructions for processing information associated with the first resolution and a database, and one or more instructions for determining whether a first geometry representation associated with the first surface patch tessellated at the first resolution is present in the database. Additionally, the computer-readable medium includes one or more instructions for if the first geometry representation is not present, generating the first geometry representation based on at least information associated with the first surface patch and the first resolution. Moreover, the computer-readable medium includes one or more instructions for determining whether the ray and the first surface patch intersect based on at least information associated with the ray and the first geometry representation. The one or more instructions for determining a first resolution includes one or more instructions for processing information associated with the ray and the first surface patch, one or more instructions for determining a first ray differential based on at least information associated with the ray and the first surface patch, one or more instructions for processing information associated with the first ray differential and the first surface patch, and one or more instructions for determining the first resolution based on at least information associated with the first ray differential and the first surface patch. The first surface patch is associated with a second resolution. The one or more instructions for if the first geometry representation is not present, generating the first geometry representation based on at least information associated with the first surface patch and the first resolution includes one or more instructions for if the first resolution is higher than the second resolution, determining the first geometry representation by tessellating the first surface patch at the second resolution and storing the first geometry representation into the database.

According to yet another embodiment of the present invention, a system for rendering a plurality of objects includes a processing system. The processing system is configured to receive ray differential information associated with a ray, determine a first resolution associated with a first surface patch based on at least information associated with the ray and the first surface patch, process information associated with the first resolution and a database, and determine whether a first geometry representation associated with the first surface patch tessellated at the first resolution is present in the database. Additionally, the processing system is configured to if the first geometry representation is not present, generate the first geometry representation based on at least information associated with the first surface patch and the first resolution. Moreover, the processing system is configured to determine whether the ray and the first surface patch intersect based on at least information associated with the ray and the first geometry representation. The determine a first resolution includes process information associated with the ray and the first surface patch, determine a first ray differential based on at least information associated with the ray and the first surface patch, process information associated with the first ray differential and the first surface patch, and determine the first resolution based on at least information associated with the first ray differential and the first surface patch. The first surface patch is associated with a second resolution. The generate the first geometry representation based on at least information associated with the first surface patch and the first resolution includes if the first resolution is higher than the second resolution, determine the first geometry representation by tessellating the first surface patch at the second resolution and store the first geometry representation into the database.

Many benefits are achieved by way of the present invention over conventional techniques. For example, certain embodiments of the present invention use ray differentials to determine appropriate tessellation rates and levels of details for geometry representations, and use a multiresolution geometry cache to store the tessellated geometries for reuse. Some embodiments of the present invention provide efficient computation of ray tracing and global illumination in very complex scenes. For example, many geometries are generated and cached at appropriate resolutions and levels of details. Some embodiments of the present invention can handle very complex geometries and provide correct reflections and refractions, self-interreflections, shadows, and reduced manual setups. Certain embodiments of the present invention can avoid or reduce shader limitations resulting from ray reordering, and handle scenes more complex than the ray reordering technique. For example, a geometry can be tessellated even though the fine tessellation of such geometry takes up a memory 100 times larger than the geometry cache. Some embodiments of the present invention provide efficient distribution ray tracing in complex scenes. Distribution ray tracing is used at least by many global illumination methods such as the irradiance caching method of the Radiance program. Additionally, distribution ray tracing can be used for final gathering of photon maps, one-bounce global illumination, and ambient occlusion.

Various additional objects, features and advantages of the present invention can be more fully appreciated with reference to the detailed description and accompanying drawings that follow.

DETAILED DESCRIPTION OF THE INVENTION

Figure 1:
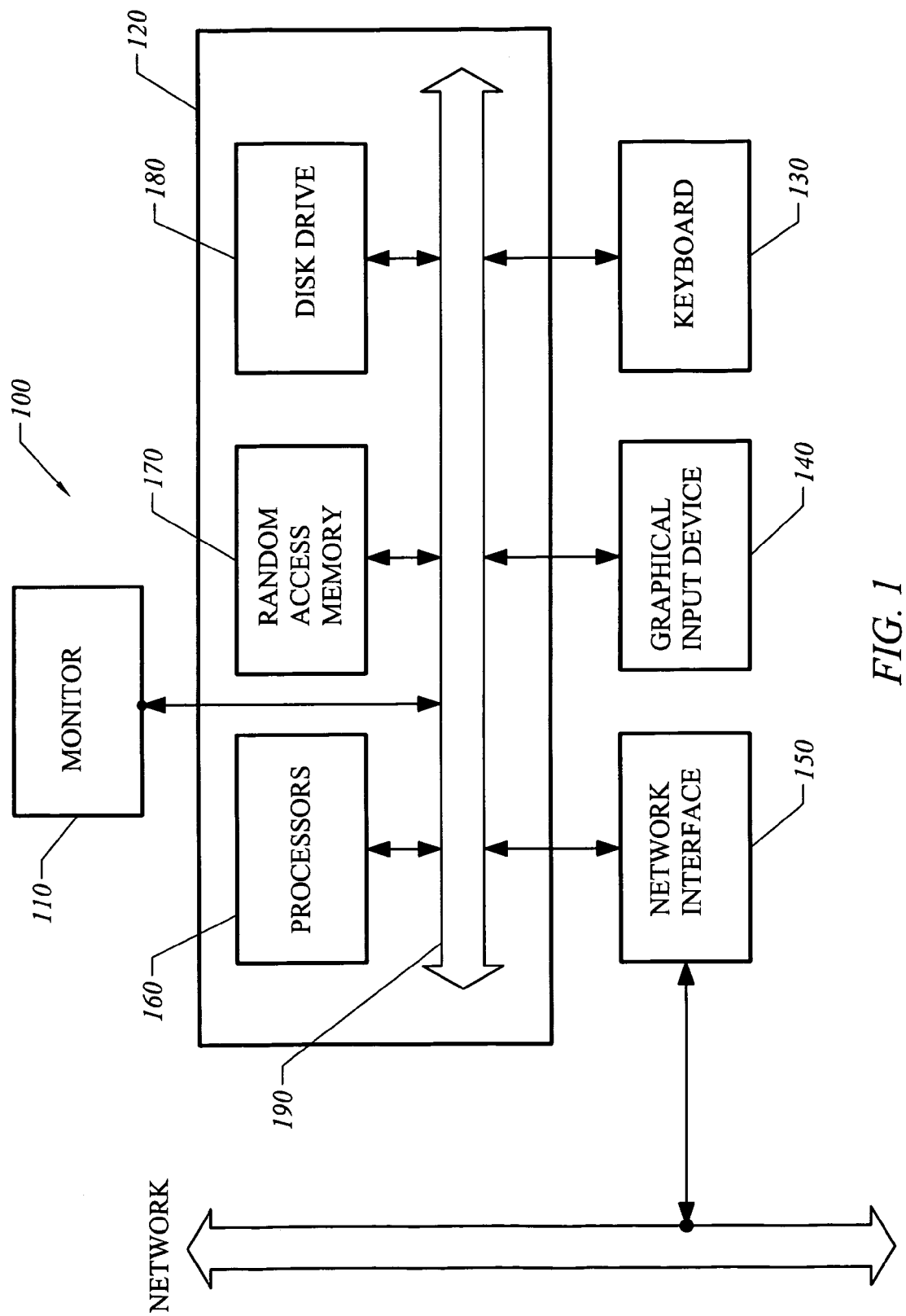
FIG. 1 illustrates a block diagram of a rendering system according to one embodiment of the present invention.

The present invention relates in general to computer animation techniques. More particularly, the invention provides a method and system for multiresolution geometry caching based on ray differentials. Merely by way of example, the invention is described as it applies to a ray tracing process, but it should be recognized that the invention has a broader range of applicability.

For conventional scanline rendering techniques, the used reflection and refraction maps may result in distorted and incorrect reflections and refractions. Additionally, such maps usually cannot handle self-interreflections. With conventional ray-tracing techniques, reflection and refraction rays can go in many directions if the scene contains surfaces with high curvature or high-frequency bumps or displacements. These rays are usually incoherent and a geometry cache of limited size may thrash. Additionally, shadow maps are not suitable for computing tiny, sharp shadows in large scenes due to the fixed resolution. Furthermore, bounce lights may require a lot of painstaking trial and error to emulate color bleeding.

Conventional ray reordering techniques rely on being able to pre-compute the contribution of a ray before the ray is traced. The pre-computation is suitable for shooting a fixed number of rays from a shader with a linear bidirectional reflectance distribution function (BRDF), but the pre-computation makes adaptive sampling difficult. The pre-computation often does not work with certain "creative" shaders that are usually desirable in production. For example, there is often no way to predetermine the contribution of each ray if a surface should be red when more than half of the reflection rays hit a certain object. The ray reordering techniques often do not work well with non-linear shaders.

Additionally, for certain conventional techniques using parallel ray tracing, the interactive systems often have only simple shaders and the images are too aliased for movie production.

For ray tracing without tessellation, the conventional methods are usually slower than ray tracing tessellated surfaces if the tessellation fits in memory. Additionally, the tessellation can make ray tracing of surfaces with arbitrary displacements simple. For example, without tessellation, ray intersections with very complex displaced surfaces may be computed, but is restricted to displacements along the surface normal and often requires repeated evaluations of the displacement shader. The more complex the displacement shader is, the more advantageous tessellation may be.

The following description refers to a number of system diagrams and processes. These diagrams are merely illustrations, which should not unduly limit the scope of the claims. One of ordinary skill in the art would recognize many variations, alternatives, and modifications. Although the embodiments will be described using a selected group of systems, there can be many alternatives, modifications, and variations. For example, some of the systems may be expanded and/or combined. Other systems may be inserted to those specifically noted. Depending upon the embodiment, the specific systems may be interchanged with others replaced. Further details of these elements are found throughout the present specification.

Similarly, although some embodiments will be described using a selected sequence of processes, there can be many alternatives, modifications, and variations. For example, some of the processes may be expanded and/or combined. Other processes may be inserted to those specifically noted. Depending upon the embodiment, the specific sequence of steps may be interchanged with others replaced. Further details of these processes and steps are found throughout the present specification.

FIG. 1 is a simplified computer rendering system according to an embodiment of the present invention. This diagram is merely an example, which should not unduly limit the scope of the claims. One of ordinary skill in the art would recognize many variations, alternatives, and modifications. The computer system 100 includes a monitor 110, a computer 120, a keyboard 130, a user input device 140, a network interface 150.

The user input device 140 is embodied as a computer mouse, a trackball, a track pad, wireless remote, and the like. The user input device 140 allows a user to select objects, icons, text and the like that appear on the monitor 110.

The network interface 150 includes one or more of an Ethernet card, a modem (telephone, satellite, cable, ISDN), (asynchronous) digital subscriber line (DSL) unit, and the like. The network interface 150 is usually coupled to a computer network as shown. In other embodiments, the network interface 150 may be physically integrated on the motherboard of the computer 120, may be a software program, such as soft DSL, or the like.

The computer 120 includes computer components such as a processor 160, and memory storage devices, such as a random access memory (RAM) 170, a disk drive 180, and a system bus 190 interconnecting the above components. In another embodiment, the computer 120 is a PC compatible computer having multiple microprocessors such as Xeon™ microprocessor from Intel Corporation. The computer 120 usually includes an operating system such as UNIX.

The RAM 170 and the disk drive 180 are examples of tangible media for storage of data, audio/video files, computer programs, embodiments of the herein described invention including scene descriptors, object data files, shader descriptors, a rendering engine, output image files, texture maps, displacement maps, object pose data files, and the like. Other types of tangible media include floppy disks, removable hard disks, optical storage media such as CD-ROMs and bar codes, semiconductor memories such as flash memories, read-only-memories (ROMs), battery-backed volatile memories, networked storage devices, and the like.

The computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

As discussed above and further emphasized here, FIG. 1 is representative of computer systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™ or G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like. In yet another example, the present invention can be embodied with dedicated graphics processing units (GPUs) or special-purpose ray tracing hardware implemented with very large scale integrated (VLSI) chips or application-specific integrated circuits (ASICs).

Figure 2:
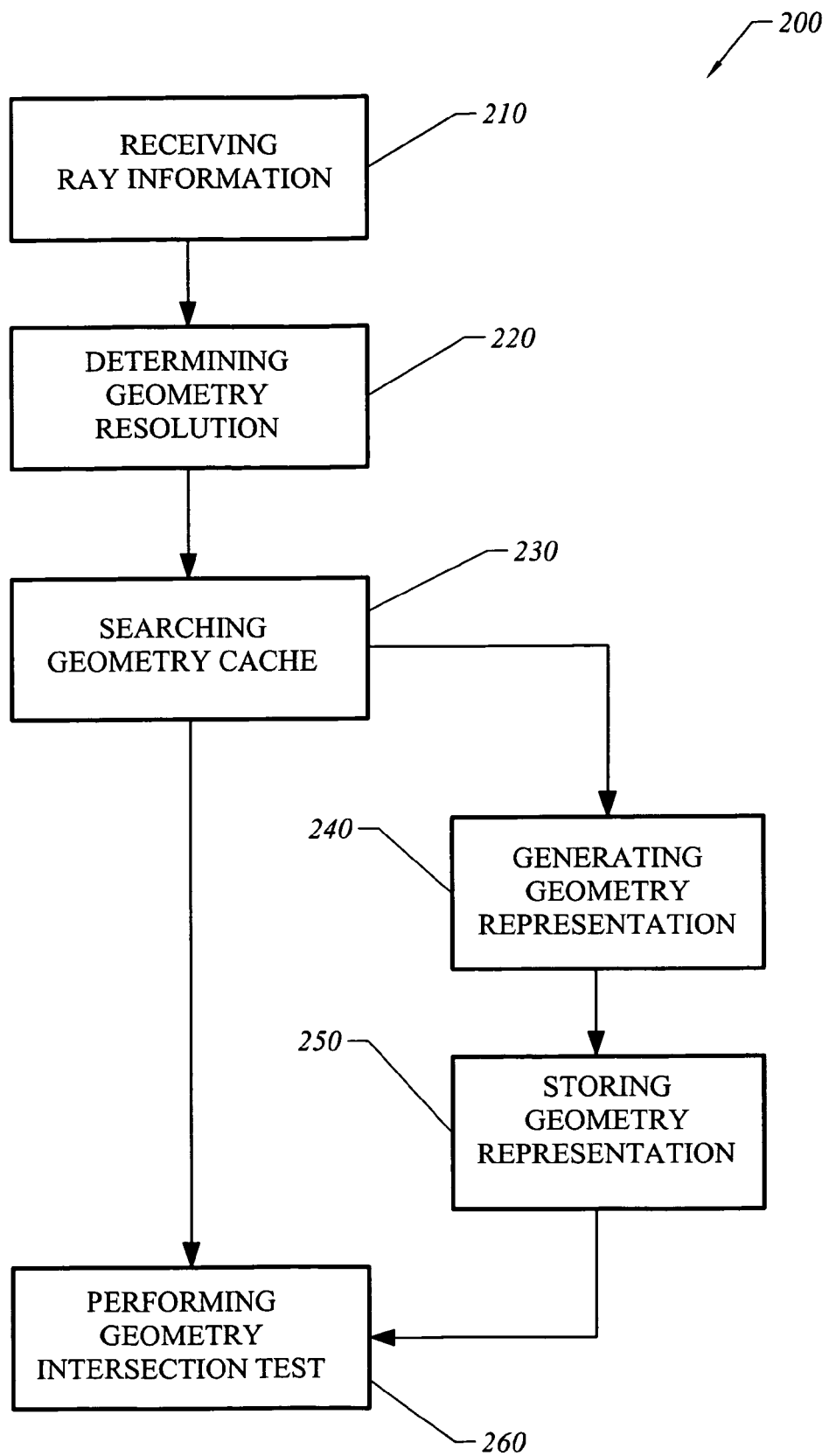
FIG. 2 is a simplified ray tracing method according to an embodiment of the present invention.

FIG. 2 is a simplified ray tracing method according to an embodiment of the present invention. This diagram is merely an example, which should not unduly limit the scope of the claims. One of ordinary skill in the art would recognize many variations, alternatives, and modifications. The method 200 includes a process 210 for receiving ray information, a process 220 for determining geometry resolution, a process 230 for searching geometry cache, a process 240 for generating geometry representation, a process 250 for storing geometry representation, and a process 260 for performing geometry intersection test. Further details of these processes are found throughout the present specification and more particularly below.

Figure 3:
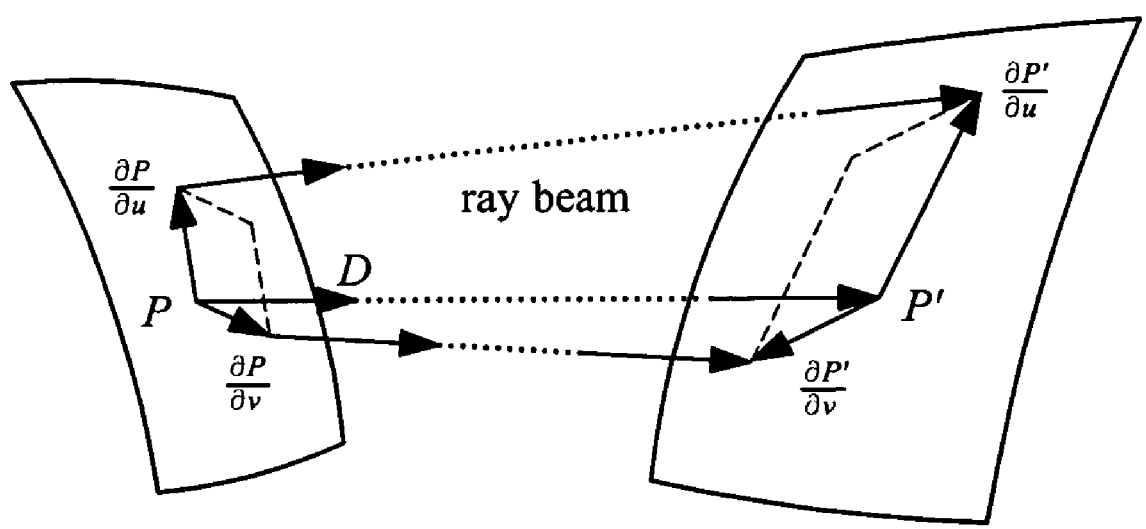
FIG. 3 is a simplified diagram for a ray differential according to an embodiment of the present invention.

At the process 210, ray information is received. For example, ray information is related to ray differential. FIG. 3 is a simplified diagram for a ray differential according to an embodiment of the present invention. This diagram is merely an example, which should not unduly limit the scope of the claims. One of ordinary skill in the art would recognize many variations, alternatives, and modifications. As shown in FIG. 3, a ray includes an origin P and a direction D. The ray differential at P is $$\left(\frac{\partial P}{\partial u}, \frac{\partial P}{\partial v}, \frac{\partial D}{\partial u}, \frac{\partial D}{\partial v}\right).$$

The ray's $$\frac{\partial P'}{\partial u}, \frac{\partial P'}{\partial v}$$

at a point P' span a parallelogram. A ray beam is spanned by the parallelograms along the ray. The ray footprint at a ray intersection point is the projection of the ray parallelogram onto the surface tangent plane at that point. A ray is considered narrow if its ray beam has a small cross-section, and wide if its ray beam has a large cross-section.

Figure 4:
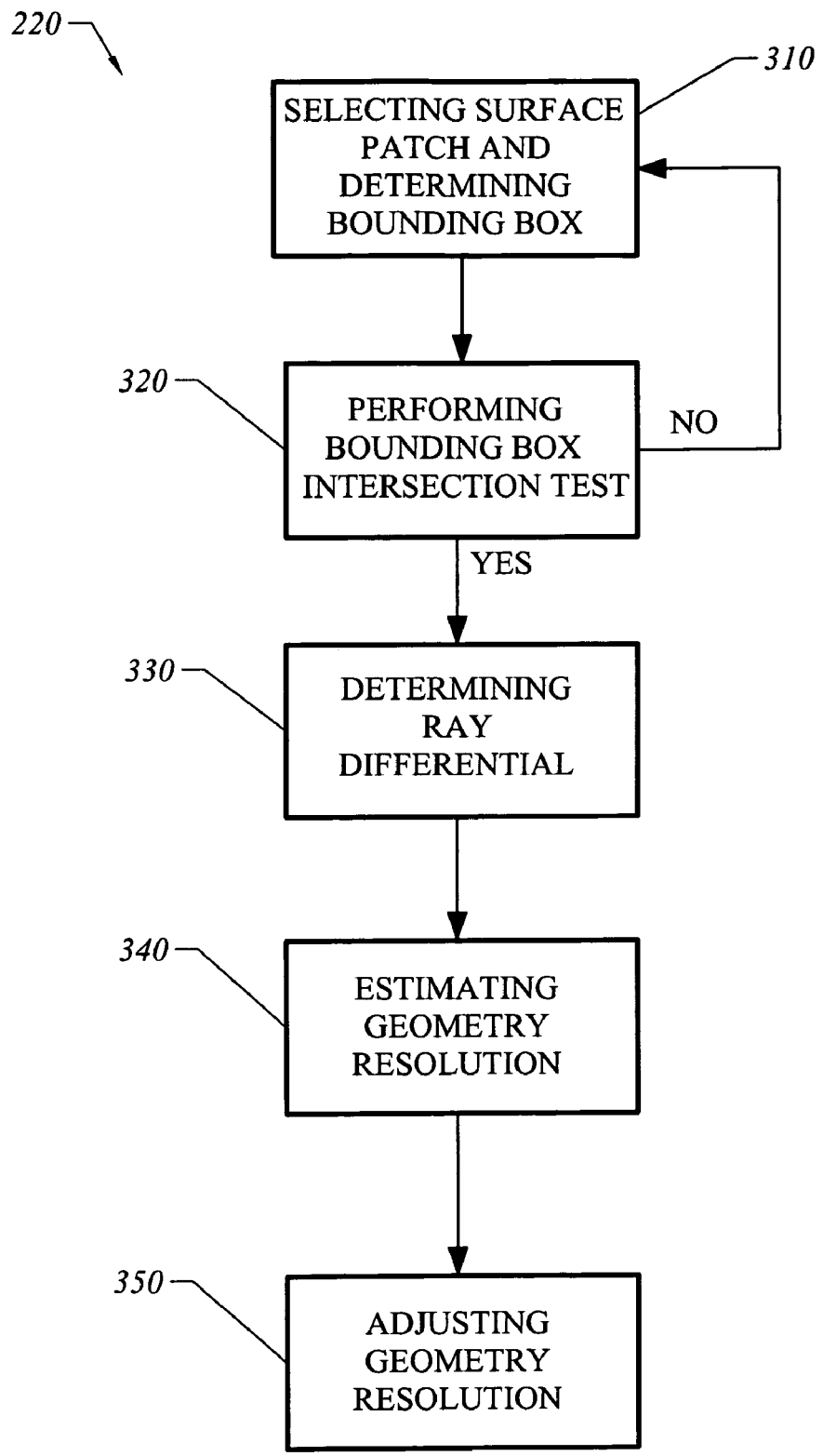
FIG. 4 is a simplified process 220 for determining geometry resolution according to an embodiment of the present invention.

At the process 220, geometry resolution is determined. FIG. 4 is a simplified process 220 for determining geometry resolution according to an embodiment of the present invention. This diagram is merely an example, which should not unduly limit the scope of the claims. One of ordinary skill in the art would recognize many variations, alternatives, and modifications. The process 220 includes a process 310 for selecting surface patch and determining bounding box, a process 320 for performing bounding box intersection test, a process 330 for determining ray differential, a process 340 for estimating geometry resolution, and a process 350 for adjusting geometry resolution. Further details of these processes are found throughout the present specification and more particularly below.

At the process 310, a surface patch is selected and its bounding box is determined. In one embodiment, a surface patch is selected and its bounding box is generated. For example, the bounding box is oriented to closely fit its content, or the bounding box can be axis aligned. In another embodiment, a plurality of bounding boxes are generated for a plurality of surface patches respectively. At the process 310, a bounding box is selected from the plurality of bounding boxes.

At the process 320, a bounding box intersection test is performed. The intersection test determines whether a ray intersects with the bounding box of a surface patch. If the ray does not intersect with the bounding box, the process 310 is performed to select another surface patch unless all surface patches have been selected. If the ray intersects with the bounding box, the process 330 is performed.

At the process 330, a ray differential is determined for the ray at the bounding box. For example, at the origin P, the ray differential is $$\left( \frac{\partial P}{\partial u}, \frac{\partial P}{\partial v}, \frac{\partial D}{\partial u}, \frac{\partial D}{\partial v} \right).$$

At the intersection point between the ray and the bounding box, the ray differential is $$\left( \frac{\partial P'}{\partial u}, \frac{\partial P'}{\partial v}, \frac{\partial D'}{\partial u}, \frac{\partial D'}{\partial v} \right).$$

$$\frac{\partial D}{\partial u} \text{ and } \frac{\partial D}{\partial v}$$

are equal to $$\frac{\partial D'}{\partial u} \text{ and } \frac{\partial D'}{\partial v}$$

respectively.

$$\frac{\partial P'}{\partial u} \text{ and } \frac{\partial P'}{\partial v}$$

are related to $$\frac{\partial P}{\partial u} \text{ and } \frac{\partial P}{\partial v}$$

respectively by the distance between the origin P and the intersection.

At the process 340, a geometry resolution is estimated based on the ray differential at the intersection. In one embodiment, the bounding box determined at the process 310 corresponds to a surface patch. The tessellated version of the surface patch should have quadrilaterals or triangles about the same size as the ray beam cross-section. For example, a quadrilateral has four sides with approximate equal length. The length is determined based on the values of $$\frac{\partial P'}{\partial u} \text{ and } \frac{\partial P'}{\partial v}.$$

In one embodiment, the length equals the larger one, the smaller one, or the average of $$\frac{\partial P'}{\partial u} \text{ and } \frac{\partial P'}{\partial v}.$$

For example, $$\frac{\partial P'}{\partial u} \text{ and } \frac{\partial P'}{\partial v}$$

each are equal to 0.5 millimeter, and the length is determined to be 0.5 millimeter. If the surface patch has a length in u direction of 2 millimeters and a length in v direction of 3 millimeters, the geometric resolution for tessellation should be 4×6 quads.

At the process 350, the estimated geometry resolution is adjusted. The adjusted geometry resolution is used as the determined geometry resolution from the process 220. For example, the magnitude of the adjustment may be zero or nonzero. In one embodiment, if the estimated resolution is not the same as any of a plurality of predetermined resolutions, the estimated resolution is adjusted to be the same as one of the plurality of predetermined resolutions. If the estimated resolution is the same as any of the plurality of predetermined resolutions, the adjustment to the estimated resolution is zero. For example, the adjusted resolution is higher than the resolution estimated at the process 330 in both the u direction and the v direction. As an example, a plurality of predetermined resolutions include 16×16 quads, 4×4 quads, and 1 quad, and the estimated resolution is 11×7 quads. In one embodiment, the estimated resolution is adjusted to 16×16 quads.

In yet another example, a plurality of predetermined resolutions include 17×10 quads, 5×3 quads, and 2×1 quads, and the estimated resolution is 11×7 quads. In one embodiment, the resolution is adjusted to 17×10 quads.

As discussed above and further emphasized here, FIG. 4 is merely an example, which should not unduly limit the scope of the claims. One of ordinary skill in the art would recognize many variations, alternatives, and modifications. In one embodiment, at the process 310 a surface patch is selected without determining its bounding box. At the process 320, the intersection test is performed between a ray and the surface patch. At the process 330, a ray differential is determined at the intersection between the ray and the surface patch. At the process 340, a geometry resolution is estimated based on the ray differential. At the process 350, the estimated geometry resolution is adjusted. In another embodiment, the bounding box determined and tested in the processes 310 and 320 may include a plurality of bounding boxes. For example, at the process 320, if the ray intersects with the bounding box, each of the plurality of bounding boxes are tested to determine whether it intersects with the ray.

Returning to FIG. 2, at the process 230, a geometry cache is searched. The geometry cache contains a database, which can store tessellation results or be empty. In one embodiment, the database includes at least a multi-column and multi-row table. In another embodiment, the bounding box determined at the process 310 corresponds to a surface patch. The surface patch should be tessellated based on the geometry resolution determined at the process 220. At the process 230, a search is performed to determine whether the results of such tessellation are stored in the geometry cache. In one example, each surface patch is provided with an identification number, and its tessellation result, if available, is also organized according to the identification number in the geometry cache. If the results of desired tessellation are found in the geometry cache, the process 260 is performed. If the results of desired tessellation are not found, the process 240 is performed.

In one embodiment, the geometry cache includes a plurality of caches, and each of the plurality of caches stores tessellation results for a specific geometry resolution. In another embodiment, the geometry cache includes only one cache storing tessellation results for a plurality of geometry resolutions. For example, the geometry cache includes results for coarse, medium, and fine tessellations. For a fine tessellation, a large number of elements, such as 16×16 quads, are stored for a relatively few objects or geometric primitives intersected by coherent rays. For a medium tessellation, a medium number of elements, such as 4×4 quads, are stored for rays that are neither very coherent nor very narrow. For a coarse tessellation, a small number of elements, such as 1 quad can be held for many entries. Additionally, the coarse tessellation results are relatively easy to compute or re-compute since they include a small number of elements. In some embodiments, the fine tessellation results are stored with information related to bounding boxes. For example, 4×4 bounding boxes are stored, and each bounding box contains 4×4 quads for efficient intersection tests of complex geometries.

At the process 240, a geometry representation is generated at the determined geometry resolution. The generated geometry representation is stored in the geometry cache. In one embodiment, a surface patch corresponds to the bounding box determined at the process 310, and the surface patch can be tessellated at the geometry resolution determined at the process 220. As an example, a surface patch may be represented as one of a bicubic (Bezier) patch, a non-uniform rational B-spline surface of arbitrary degree (NURBS surface), a subdivision surface, a curved bilinear patch or a hyperbolic paraboloid, and displaced versions thereof. In another example, the surface patch may be represented as a displaced sphere, other quadrics, and other types of geometric primitives. In another embodiment, the determined tessellation resolution has a rate in the u direction the same as the rate in the v direction.

In yet another embodiment, the determined tessellation resolution has a rate in the u direction different from the rate in the v direction.

In yet another embodiment, the surface patch corresponding to the bounding box determined at the process 310 is associated with a reference geometry resolution. In one embodiment, for the surface patch directly visible to the viewer, the reference geometry resolution is used to render the surface patch directly onto an image plane, a screen window, or the like. The reference geometry resolution can be used to limit the geometry resolution of tessellation for the surface patch corresponding to the bounding box. In one example, the reference geometry resolution is lower than the highest resolution of the plurality of predetermined resolutions. In such a case, the geometry representation is generated at a geometry resolution coarser than the resolution determined at the process 220 by a factor. Specifically, the geometry resolution is coarser by a factor approximately equal to the ratio between the highest predetermined resolution and the reference geometry resolution. In the present embodiment, the generated geometry representation is associated with the resolution determined at the process 220 and is stored into the geometry cache. For example, the geometry representation is generated at the reference geometry resolution if the determined geometry resolution is equal to the highest resolution of the plurality of predetermined resolutions.

The limitation on the predetermined resolutions as discussed above has various advantages. One advantage is that the surface patch is not tessellated at a geometry resolution higher than the reference geometry resolution. Accordingly, the amount of superfluous computation is reduced. Further, this limitation reduces the number of false intersections erroneously identified at the process 260 described below. In the present embodiment, false intersections are defined as a reflection that includes at least an image of a surface patch that should not be reflected. Accordingly, such faulty reflections can significantly degrade image quality, for example, when the screen area for the reflection is large.

In yet another embodiment, the process 240 includes determining whether the tessellation to be performed is the first tessellation for the surface patch. If the surface patch has not been tessellated, the tessellation is performed at the highest resolution among the predetermined resolutions. The tessellation results are used to update the bounding box. Only a subset of the tessellation results are stored at the process 250 and used at the process 260 described below if the determined resolution is not the highest predetermined resolution. In one embodiment, the highest resolution is limited by the reference geometry resolution. In another embodiment, the highest resolution is not limited by the reference geometry resolution.

The tessellation and update on bounding box as discussed above have various advantages. For example, updating the bounding box can make the bounding box more tightly surround its contents. In one embodiment, without tessellation, the bounding box is often determined to enclose the largest possible displacement within a predetermined range for displacement-mapped surface patches. An updated and more accurate bounding box usually reduces the number of potential intersections that are identified at the process 320. Accordingly, significant saving of computation time and cache memory can be realized.

As shown in FIG. 2, at the process 250, the geometry representation is stored in the geometry cache. In one embodiment, if the geometry cache is full for the determined resolution, a least-recently-used (LRU) cache replacement scheme is used. The size of the geometry cache and its partition for different resolutions can be specified by the user.

At the process 260, a geometry intersection test is performed. The intersection test determines whether a ray intersects the surface patch that is surrounded by the bounding box determined at the process 310. In one embodiment, the intersection test uses quadrilaterals or triangles resulted from tessellation at the determined geometry resolution.

As discussed above, at the process 340, in one embodiment, if the estimated resolution is not the same as any of a plurality of predetermined resolutions, the estimated resolution is adjusted to the nearest finer resolution among the plurality of predetermined resolutions. In one embodiment, at the process 260, the tessellation results for the adjusted resolution is coarsened using linear interpolation. The linear interpolation uses the tessellation results for the nearest finer resolution, and the tessellation results for at least one another predetermined resolution that is coarser than the adjusted resolution. The tessellation results for the at least one another predetermined resolution may be generated or retrieved from the geometry cache. The interpolation can also be non-linear. As an example, the predetermined resolutions are modified by the reference geometry resolution. In another example, the tessellation results for the adjusted resolution may be modified by merging each set of 2×2 quads into one quad for faster intersection testing. In yet another example, the plurality of predetermined resolutions have three resolutions, but can provide at least five different tessellation resolutions for intersection testing.

The interpolation technique as discussed above can provide various advantages. One advantage is a smooth transition between multiple adjusted resolutions. If a surface patch has a tessellation resolution changing abruptly, popping may occur between frames. The interpolation can reduce popping and significantly improve image quality.

As discussed above and further emphasized here, FIGS. 2–4 are merely an example, which should not unduly limit the scope of the claims. One of ordinary skill in the art would recognize many variations, alternatives, and modifications. In one embodiment, a surface patch is used to define at least a part of a surface of an object. For example, the surface is divided into a plurality of surface patches. In another example, a surface patch is also used to refer to a surface subpatch. In another embodiment, the method 200 is performed without using a multiresolution geometry cache. In yet another embodiment, the method 200 is performed without determining geometry resolution based on ray differential.

In yet another embodiment, reflection from a moving object can be rendered with motion blur. For each frame, a plurality of rays are shot at different times stochastically selected between the shutter open time and the shutter close time. For each of these rays, some or all of the processes 210, 220, 230, 240, 250, and 260 are performed. As an example, at the process 230, a search is performed for the tessellation results for a surface patch of the moving object at a first time and a second time. The desired geometry resolution is determined at the process 220. For example, the first time is the shutter open time, and the second time is the shutter close time. At the process 240, the tessellations are performed at the first time and the second time for the surface patch associated with the moving object, i.e., at least two tessellations are performed. At the process 250, the tessellation results including the point positions at the first time and the second time are stored in the geometry cache. At the process 260, the tessellation results at a given time stochastically selected within the shutter interval are determined using the tessellation results at the first time and the second time. For example, the tessellation results are determined by linear interpolating the tessellation results at the shutter open time and the shutter close time. In another example, a non-linear interpolation is contemplated. The interpolated tessellation is then used for ray-geometry intersection tests as described above.

The determination of tessellation results based on the tessellation results at the first time and the second time provides various advantages. One advantage is significant reduction of computation time and size of cache memory. This advantage is especially important if there are many moving objects in a scene, and motion blur needs to be rendered for many individual frames. In one embodiment, the interpolation technique can limit tessellation to the shutter open time and the shutter close time. For each frame, a plurality of rays is shot at times stochastically selected between the shutter open time and the shutter close time. Additionally, for different frames, the rays are likely to be shot at different times. Accordingly, the tessellation results generated for a plurality of times in a given frame usually cannot be used for another plurality of times in a different frame. Hence the interpolation can significantly reduce the computation complexity and storage of tessellation results, and also shorten the movie turnaround time.

In yet another embodiment, to remove or reduce gaps between neighbor surface patches with different resolutions, a stitching process is performed. Without stitching, the reflection in a surface patch may include an image of an object that is behind the surface patch being reflected but is visible through the crack. Consequently, the reflected image may include certain pixels with colors inconsistent with those of surrounding pixels, and such colors and its locations resulting from the crack may change from one frame to another. Accordingly, the stitching technique of the present embodiment can significantly remove or reduce gaps and improve image quality. As an example, the inventors have discovered that the stitching process for directly visible objects, such as by moving binary-diced vertices, can also be applied to the present embodiment.

In yet another embodiment, at the process 260, an issue discovered is that in some cases objects appear to be "popping" in animations due to sudden change of tessellation rate. The inventors have discovered that the "popping" can be reduced or prevented by adjusting the tessellation rate. For example, the tessellation rate is stochastically adjusted by rounding up or down for each patch intersection test. In yet another embodiment, for disco balls or other objects with small mirror facets, the beam size of the reflection rays is artificially increased, or a simplified scene for reflections is used in the disco ball. In yet another embodiment, at the process 260, a tessellation coarser than the beam size is used when the ray's image contribution is low. In yet another embodiment of the present invention, a parallel implementation may be used. The observations about ray differentials and coherency could improve the efficiency of parallel renderers.

Figure 5:
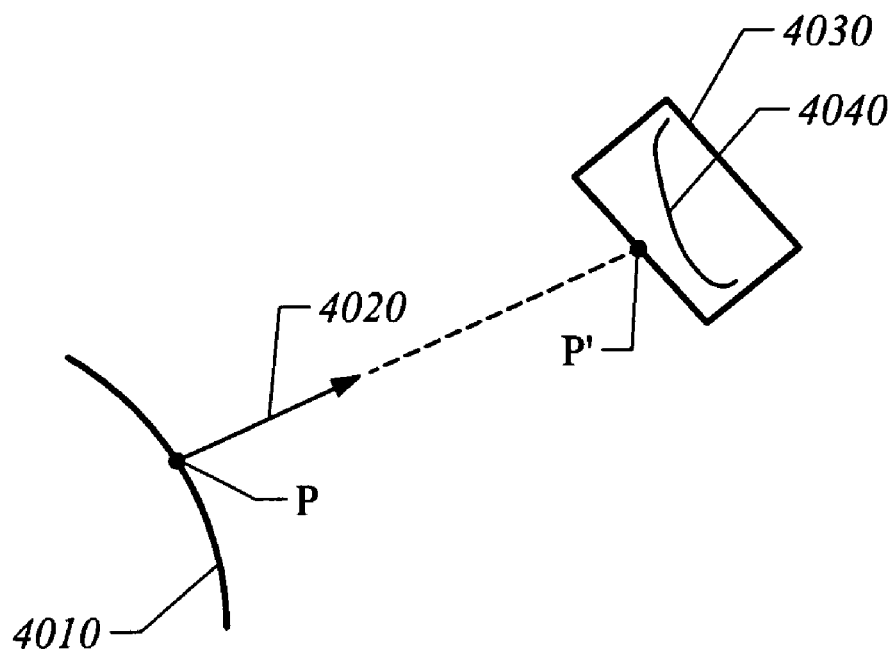
FIGS. 5(*a*), (*b*), and (*c*) show some examples of certain embodiments of the present invention.
Figure 5:
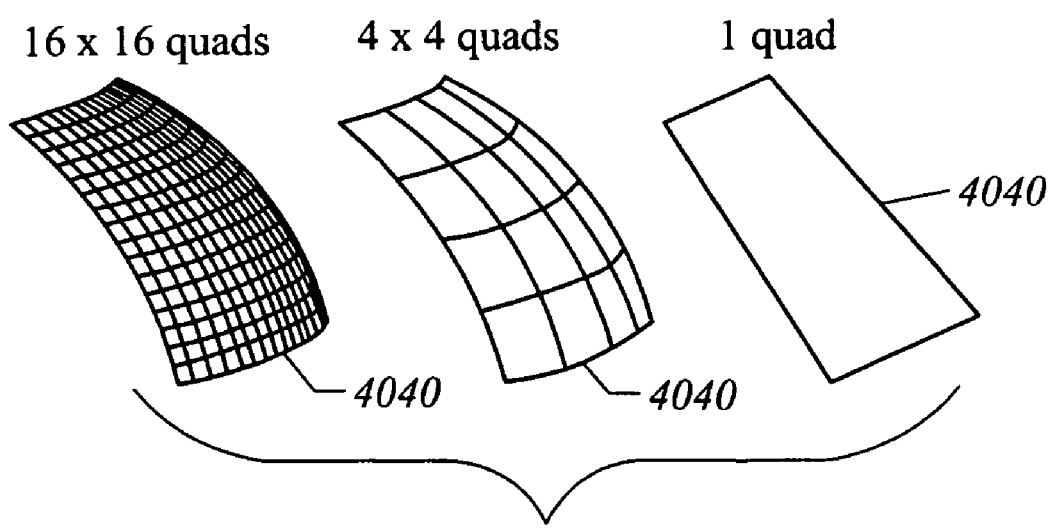
Figure 5:
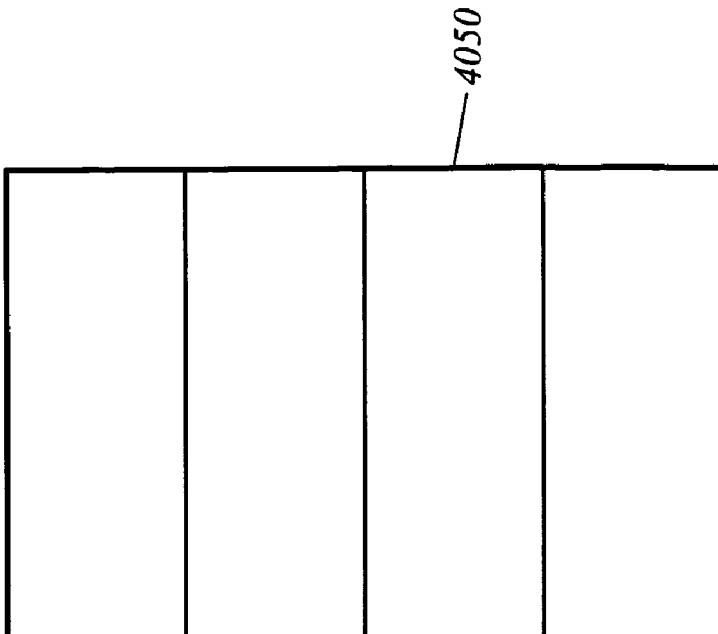

FIGS. 5(a)–5(c) show some examples of certain embodiments as discussed above. These diagrams are merely examples, which should not unduly limit the scope of the claims. One of ordinary skill in the art would recognize many variations, alternatives, and modifications. As shown in FIG. 5(a), at the process 210, ray information is received. As an example, a ray 4020 is shot from an origin P on a surface 4010. At the origin P, the ray 4020 is associated with a direction D and a ray differential.

At the process 220, a geometry resolution is determined. At the process 310, a bounding box 4030 is determined. The bounding box 4030 surrounds a surface patch 4040. At the process 320, it is determined that the ray 4020 intersects the bounding box 4030 at an intersection P'. At the process 330, a ray differential for the ray 4020 at the intersection P' is determined. As an example, the ray differential equals to 0.5 millimeters in both the u direction and the v direction. At the process 340, a geometry resolution is estimated based on the ray differential at the intersection P'. As an example, the surface patch 4040 has a length in u direction of 5.5 millimeters and a length in v direction of 3.5 millimeters. Accordingly, the estimated geometric resolution is 11×7 quads. At the process 350, the estimated geometry resolution is adjusted. As shown in FIG. 5(b), a plurality of predetermined resolutions include 16×16 quads, 4×4 quads, and 1 quad. Accordingly, the estimated resolution of 11×7 quads is adjusted to 16×16 quads.

At the process 230, a geometry cache is searched. As shown in FIG. 5(c), the geometry cache contains a table 4050. The table 4050 includes a row for storing identification numbers corresponding to surface patches, and three rows for storing tessellations results at predetermined resolutions. As an example, a cell 4060 stores the identification number of the surface patch 4040, and a cell 4070 does not contain the tessellation results for the surface patch 4040 at 16×16 quads. Accordingly, the desired tessellation results are not found in the geometry cache.

At the process 240, a geometry representation is generated for the surface patch 4040. In one embodiment, the surface patch 4040 is directly visible to the viewer and rendered onto a screen window at a reference geometry resolution. For example, the reference geometry resolution is 8×12 quads. Accordingly, at the process 240, the geometry representation is generated at 8×12 quads for the surface patch 4040. Then at the process 250, such geometry representation generated at 8×12 quads is stored in the cell 4070 of the table 4050. At the process 260, a geometry intersection is performed. The intersection test determines whether the ray 4020 intersects the surface patch 4040 based on the tessellation results generated at the process 240.

As shown in FIGS. 2, 3, 4, and 5(a)–5(c), some embodiments of the present invention have various applications. In certain applications, a tessellated version of at least a large portion of the entire scene needs to be stored in memory since many rays are incoherent. Additionally, a fine tessellation is also needed because some rays may require high accuracy. In many cases, coherent rays have narrow beams, and incoherent rays have wide beams.

For example, specular reflection and refraction rays from surfaces with low curvature and shadow rays to point-like light sources have small differentials. These rays may require high accuracy and fine tessellation, and they are usually coherent. Using a geometry cache with relatively few entries works well. In another example, specular reflection and refraction rays from highly curved surfaces and rays from wide distribution ray tracing often have large differentials and usually do not require high accuracy. These rays can use a coarse tessellation, and they are often incoherent. A cache can store many coarse entries.

In one embodiment, a multiresolution geometry caching scheme has separate caches for coarsely, medium, and finely tessellated surfaces. This exploits the different coherencies of various types of rays, and their different accuracy requirements. It is interesting to note that this scheme results in an automatic level-of-detail representation of the tessellation—a tessellation MIP map.

For example, the high-level descriptions of all objects are assumed to fit in memory. NURBS control points, top level subdivision meshes, etc. are typically orders of magnitude more compact than their fully tessellated representation. The extra memory used is for the geometry cache with a fixed size such as 30 MB, and a spatial acceleration data structure. For example, the spatial acceleration data structure is less than 50 MB for very complex scenes.

In another embodiment, all geometry is tessellated on demand. The appropriate tessellation rate is chosen based on ray size, and the quads should be approximately the same size as the ray beam cross-section. Using smaller quads is usually a waste of time and memory, and larger quads often do not give adequate precision. Tessellation makes ray tracing faster, simplifies displacement mapping, and allows for displacements in arbitrary directions. The ability to cache displaced tessellations ensures that the displacement shader is rarely run repeatedly for the same surface.

Figure 6:
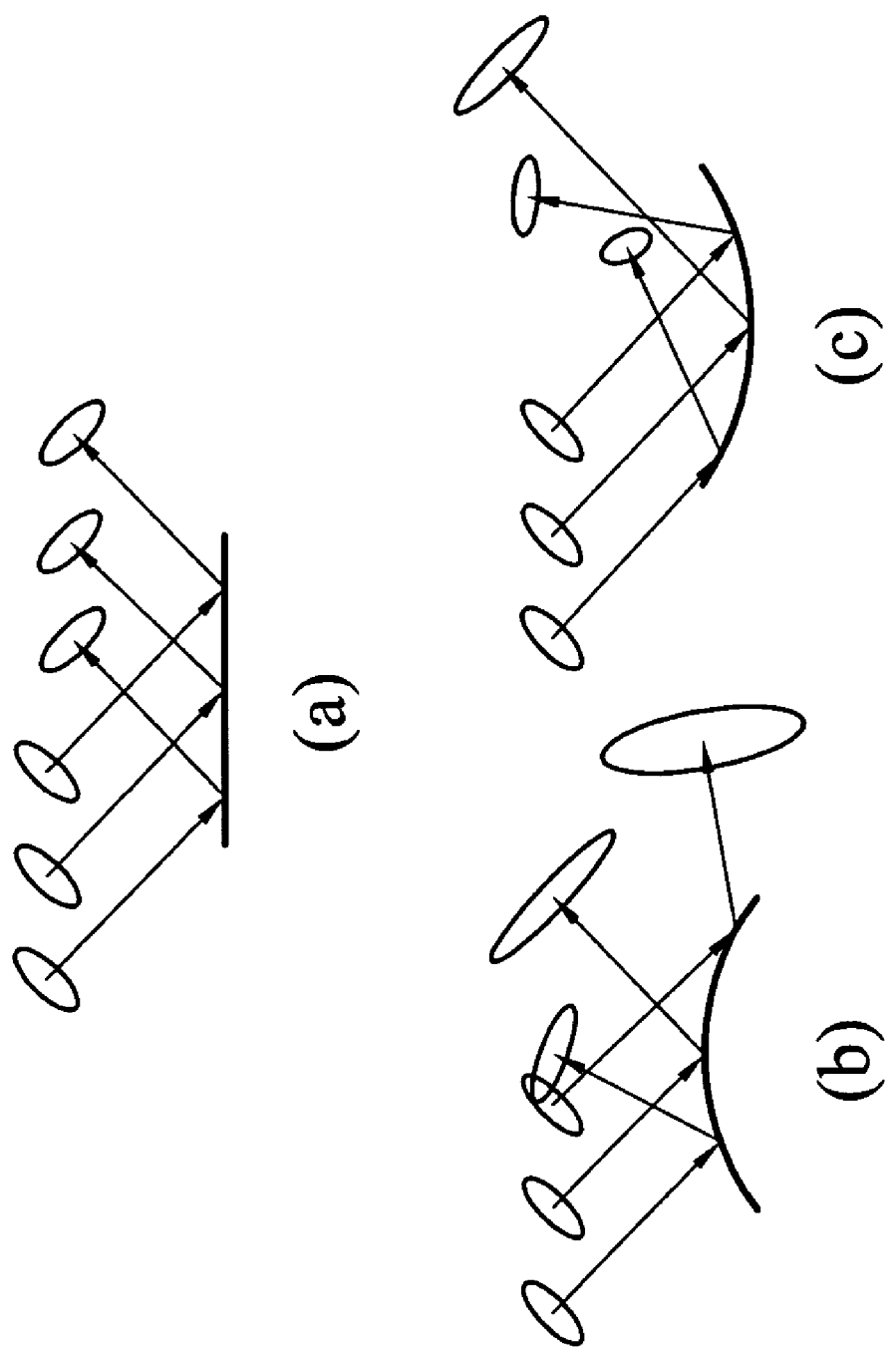
FIGS. 6(*a*), (*b*), and (*c*) are simplified diagrams for specular reflection by flat, convex, and concave surfaces respectively according to an embodiment of the present invention.

As discussed above, in certain embodiments of the present invention, coherent rays have narrow beams, and incoherent rays have wide beams. FIGS. 6(a), (b), and (c) are simplified diagrams for specular reflection by flat, convex, and concave surfaces respectively according to an embodiment of the present invention. These diagrams are merely examples, which should not unduly limit the scope of the claims. One of ordinary skill in the art would recognize many variations, alternatives, and modifications. Reflection from a flat surface gives coherent, narrow reflection rays. Conversely, reflection from a highly curved, bumped or displaced surface gives incoherent wide reflection rays: two adjacent rays are reflected in different directions, but also have large differentials. Note that even though the reflection rays from concave surfaces are initially narrow, after a certain distance, the ray differentials cross over and the rays get wider again. Similarly, refraction through a flat surface gives parallel, narrow refraction rays, while refraction through a highly curved surface gives diverging wide refraction rays. In contrast, in some embodiments of the present invention, surfaces with many tiny flat facets, as for example a disco ball, reflect rays with narrow beams, but in incoherent directions.

In certain embodiments of the present invention, shadow rays to a point, spot, or directional light source are very narrow and very coherent. In this respect, the shadow rays behave as specular reflection rays from a flat surface. If there are several light sources, the rays to each light are coherent with each other; rays to different light sources are usually not coherent. If there are thousands of light sources in a scene, usually only a small fraction of them illuminate a given point by a significant amount. The rest of the lights can be probabilistically sampled, computed without shadows, or skipped entirely. So for each part of a surface, only a few light sources may require narrow shadow rays.

Figure 7:
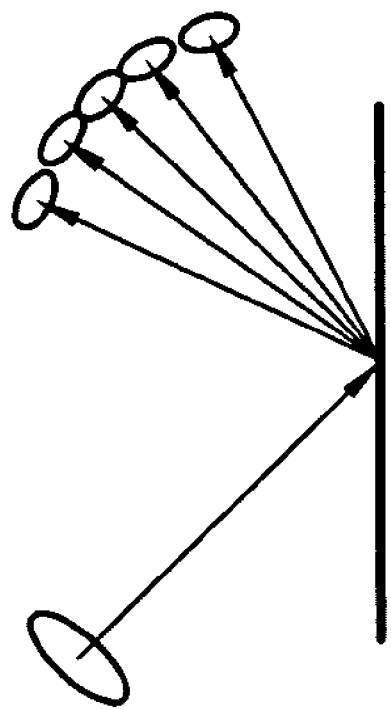
FIG. 7 is a simplified diagram for glossy reflection from flat surfaces according to an embodiment of the present invention.
Figure 7:
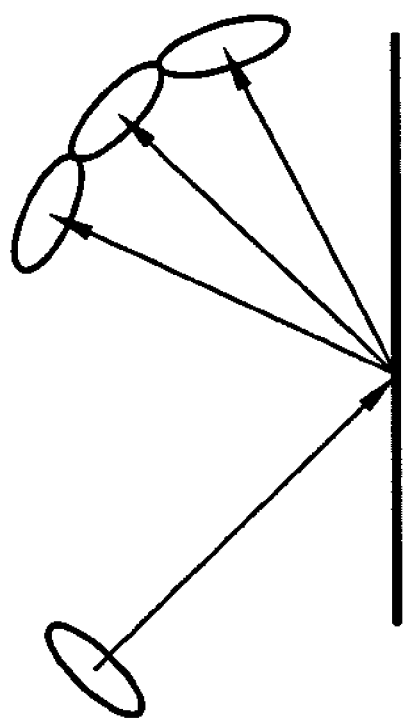

In some embodiments of the present invention, distribution ray tracing is used to render glossy reflection and refraction. FIG. 7 is a simplified diagram for glossy reflection from flat surfaces according to an embodiment of the present invention. This diagram is merely an example, which should not unduly limit the scope of the claims. One of ordinary skill in the art would recognize many variations, alternatives, and modifications. If glossiness is specified as a solid angle over which the reflection rays can be reflected, the directional differential $$\left(\frac{\partial D}{\partial u}, \frac{\partial D}{\partial v}\right)$$

of each ray corresponds to the glossy cone angle divided by the number of rays. For glossy reflection from curved surfaces, the maximum of the ray differential for specular reflection from a curved surface and the differential for glossy reflection from a flat surface may be used. Rays from narrow glossy reflection and refraction have small differentials and are coherent. Conversely, rays from wide glossy reflection and refraction have larger differentials and are incoherent.

In certain embodiments of the present invention, distribution ray tracing is used to compute soft shadows from area light sources. The directional differential of a shadow ray to an area light source is computed by taking the relative size of the light source divided by the number of shadow rays. Shadow rays to a small area light source are narrow and coherent, while shadow rays to a large area light source are wide and incoherent.

Figure 8:
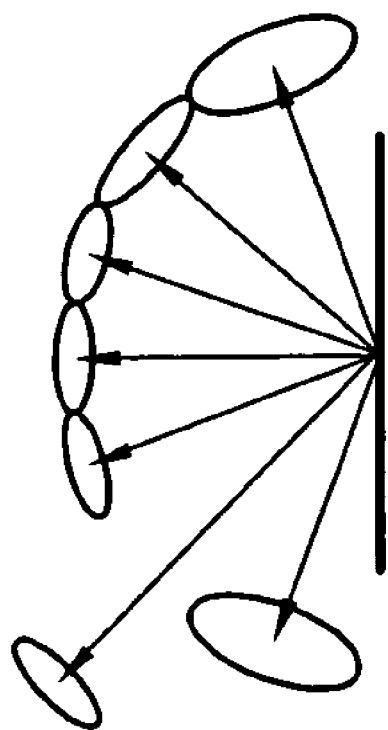
FIG. 8 is a simplified diagram for diffuse reflection from flat surfaces according to an embodiment of the present invention.
Figure 8:
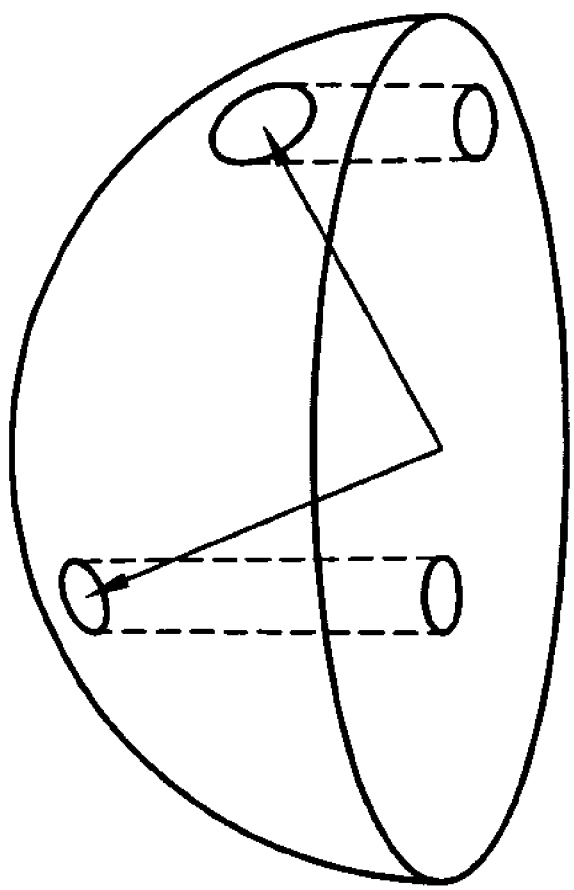

In some embodiments of the present invention, distribution ray tracing over a hemisphere is used to compute diffuse reflection and transmission (translucency), ambient occlusion, one-bounce color bleeding, and final gathering of global illumination. FIG. 8 is a simplified diagram for diffuse reflection from flat surfaces according to an embodiment of the present invention. This diagram is merely an example, which should not unduly limit the scope of the claims. One of ordinary skill in the art would recognize many variations, alternatives, and modifications. For such hemisphere sampling, the directional ray differential corresponds to the fraction of the hemisphere that is covered by that ray.

For example, the hemisphere sampling rays are quite wide, except near their origin. But the rays are hit-tested with coherent geometry near their origin even though their directions diverge. This approach may break down if there are only a few hemisphere sampling rays since the ray differentials get very large. In one embodiment, the worst case is if there is only one ray (as in path tracing); in that case the directional ray differential would correspond to the entire hemisphere. One would then have to resort to a global value based on the total number of rays at that depth. But to get hemisphere sampling results without excessive noise, many hemisphere samples such as at least 256 need to be shot.

As discussed above, coherent rays often have narrow beams, and incoherent rays usually have wide beams. In some embodiments of the present invention, this observation is used as part of extension to the REYES architecture to support ray tracing and global illumination. In a REYES renderer, all visible geometry is often tessellated into micropolygon grids and the vertices of the grids are shaded. With the addition of ray tracing, shading at these vertices can cause rays to be shot to compute reflections, shadows, etc. This hybrid rendering technique means that, in contrast to "pure" ray tracing, there are no camera rays. In an embodiment of the present invention, the tessellated surfaces used for ray tracing are not identical to the REYES micropolygon grids, so each surface patch has two representations. In another embodiment of the present invention, the two representations are identical. The merge may require the tessellation cache to be able to deal with general tessellation rates such as 5×13 instead of only the fixed rates, such as the plurality of predetermined geometry resolutions as described above.

In some embodiments of the present invention, the appropriate geometric representation is selected on-the-fly based on the ray beam sizes. If the initial patch is too large for a sufficient tessellation, for example because the object is seen through a magnifying glass or reflected by a concave mirror, we subdivide it into even smaller patches. In contrast, rendering algorithms that pre-tessellate based on screen size are sometimes wrong; in the presence of magnifying glasses, concave mirrors, etc., it is often impossible to know the necessary tessellation rate before rendering starts.

Figure 9:
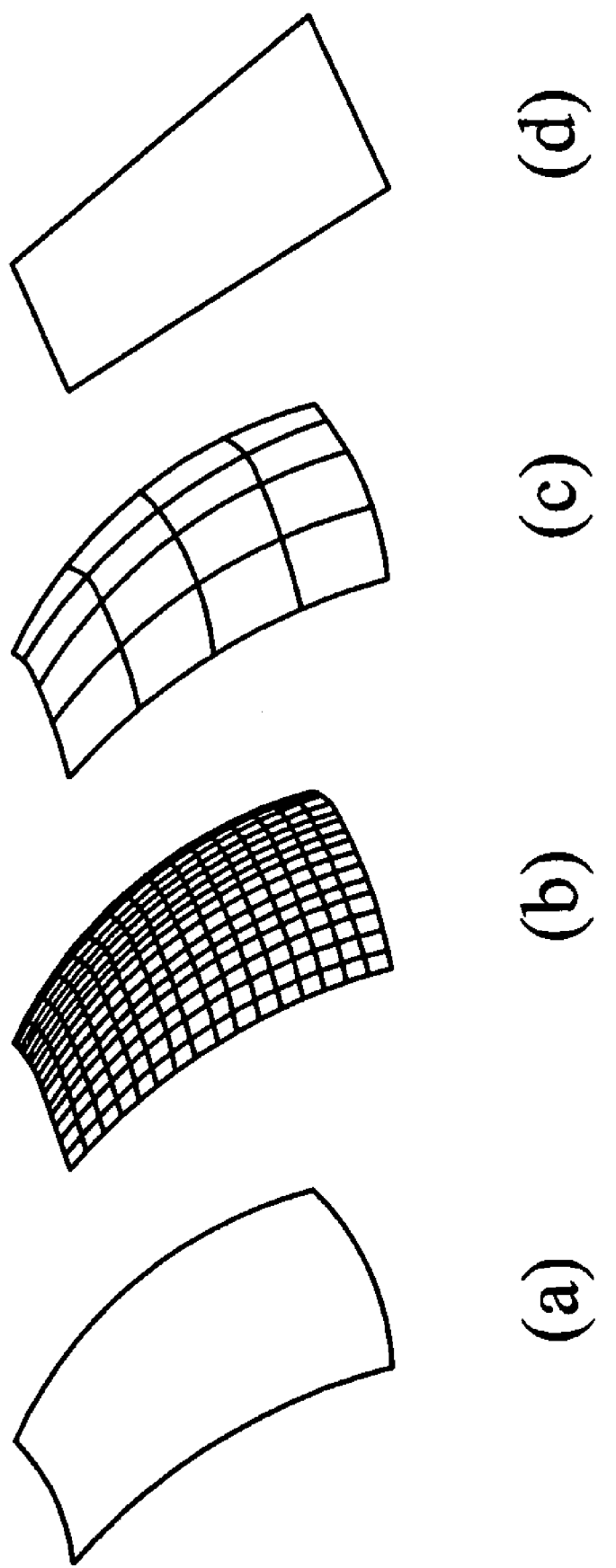
FIGS. 9(*a*), (*b*), (*c*) and (*d*) are simplified diagrams for a surface patch and its tessellations according to an embodiment of the present invention.

In certain embodiments of the present invention, a caching scheme is used with separate caches for coarse, medium, and fine tessellations to exploit the different coherency and accuracy needed. FIGS. 9(a), (b), (c) and (d) are simplified diagrams for a surface patch and its tessellations according to an embodiment of the present invention. This diagram is merely an example, which should not unduly limit the scope of the claims. One of ordinary skill in the art would recognize many variations, alternatives, and modifications. FIG. 9(a) shows an original patch. FIG. 9(b) shows results stored in a fine tessellation cache with a large number of elements, such as 17×17 vertices and 16×16 quads. The fine tessellation cache needs to hold relatively few entries since narrow rays are coherent. Additionally, the fine tessellation cache stores 4×4 bounding boxes, each of which corresponds to 4×4 quads, for efficient intersection tests. FIG. 9(c) shows results stored in a medium tessellation cache, such as 5×5 vertices and 4×4 quads for rays that are neither very coherent nor very narrow. FIG. 9(d) shows results stored in a coarse tessellation cache with small elements such as 2×2 vertices and 1 quad. The coarse tessellation cache can hold many entries. It is also cheap to re-compute the entries if they have been swapped out since they include only four vertices.

In some embodiments of the present invention, a least-recently-used (LRU) cache replacement scheme is used. The size of the geometry cache can be specified by the user. By default, the size is 10 MB for each of the three caches, so with a vertex taking up 12 bytes, the coarse cache has a capacity of 220,000 entries, the medium cache has 35,000 entries, and the fine cache has 3,000 entries. For comparison, a single fine-resolution cache of 30 MB can hold only 9,100 entries. Other choices for the number of caches and their relative sizes, or a single multiresolution cache for all tessellations can also be used.

In certain embodiments of the present invention, the appropriate cache is chosen such that the quads are approximately the same size as the ray beam. If the ray beam size is in-between cache levels, the nearest finer cache is searched. Each set of 2×2 quads is merged into one quad for faster intersection testing. The merge in effect provides five different tessellation resolutions while only storing three.

Experiments and tests have been performed for some embodiments of the present invention. The tests have used a standard PC with a 900 MHz Pentium III processor and 512 MB of memory. The rendered images are 1024 pixels wide and have micro-polygons that are at most one pixel large. A geometry cache size of 30 MB, both for single-resolution and multiresolution geometry caches, has been used except where noted.

When a ray hits the bounding box of a patch that has never been tessellated at the appropriate resolution before, the patch is tessellated at that resolution and the tessellation inserted into the cache. Such tessellation is called a cold tessellation. If the patch has been tessellated at the desired resolution before, the tessellation is looked up in the cache. A cache hit means that the tessellation was in the cache; the opposite is a cache miss. The cache hit rate is a ratio of cache hits to cache lookups. When a cache miss occurs, we have to re-tessellate the patch. Cache cost is measured as the number of vertices that are recomputed due to re-tessellations.

Figure 10:
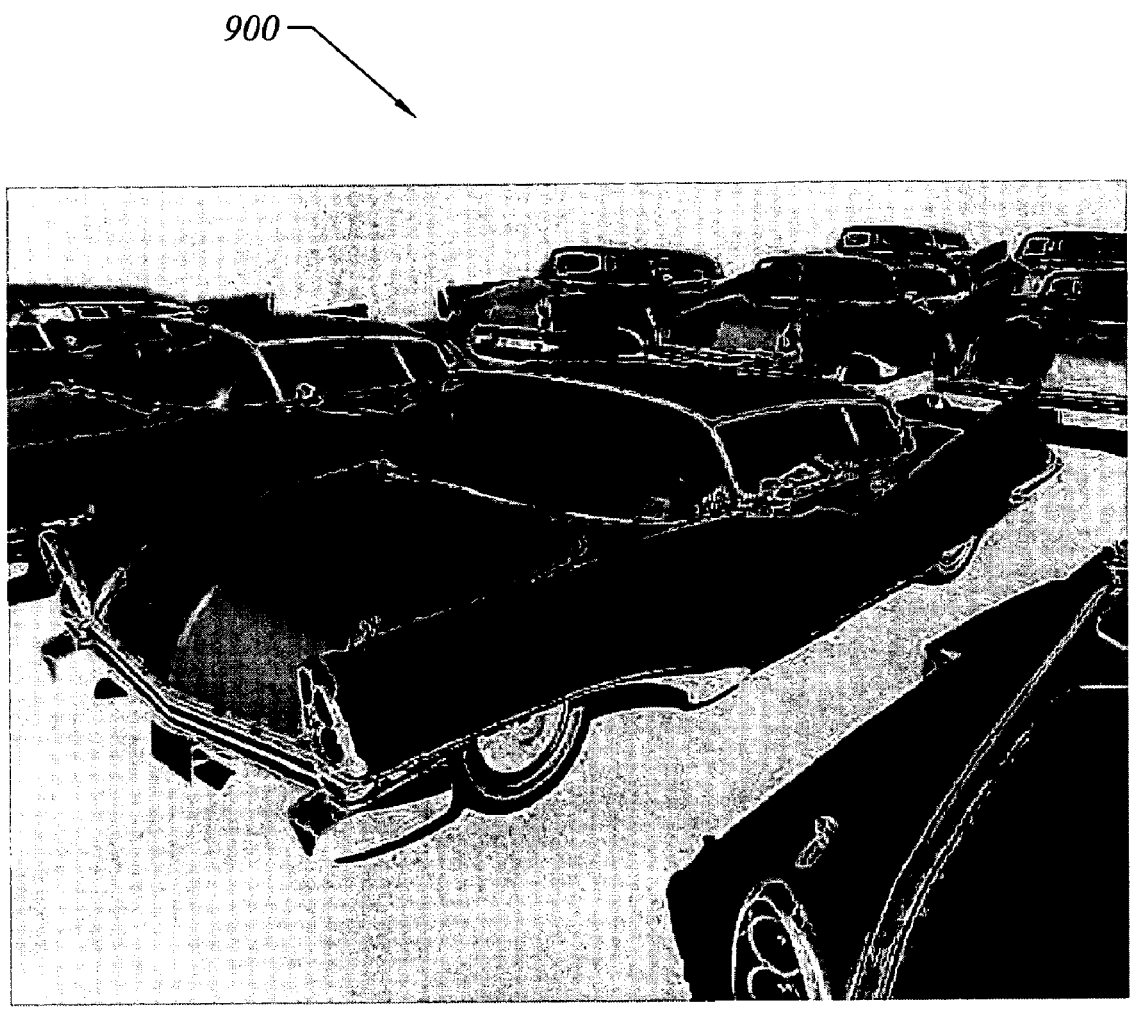
FIG. 10 is a simplified rendered image for a test scene according to an embodiment of the present invention.

FIG. 10 is a simplified rendered image for a test scene according to an embodiment of the present invention. This diagram is merely an example, which should not unduly limit the scope of the claims. One of ordinary skill in the art would recognize many variations, alternatives, and modifications. Test scene 900 includes fifteen cars on a plane, and each car includes 2155 NURBS patches, many of which have trimming curves. The cars are explicitly copied, not instanced. During rendering, the NURBS surfaces are split into 940,000 patches. A full tessellation would result in 940,000×$17^2$≈270 million vertices, 240 million quads, and 480 million triangles. The full tessellation would consume around 3.3 GB. This is 110 times the size of the geometry cache.

As shown in FIG. 10, the ground plane is purely diffuse. The car paint and chrome shaders shoot specular reflection rays. The scene is illuminated by a directional light with sharp ray traced shadows. Since the rays in this version of the scene are specular reflection rays from mostly smooth objects and shadow rays to a directional light source, most rays are coherent and narrow. Rendering the image in FIG. 10 causes the tracing of 4.1 million specular rays and 4.0 million shadow rays. These rays result in 100 million ray-patch intersection tests. According to an embodiment of the present invention, the tessellation scheme employs two distinct mechanisms to achieve efficiency: a multiresolution representation and a cache of reusable tessellations. To distinguish the contributions of each mechanism, a single-resolution tessellation is considered with and without caching.

With a single-resolution cache, there are 380,000 cold tessellations producing 110 million vertices, 100 million cache lookups, and 1.3 million cache misses, corresponding to a hit rate of 98.7% and 360 million recomputed vertices. The run time is 79 minutes. Without caching, the 100 million intersection tests would require computing 100 million× $17^2$≈29 billion vertices; this 80 times more than the vertices recomputed due to cache misses.

With a multiresolution cache, there are 400,000, 100,000, and 30,000 cold tessellations for 13 million vertices, and 35, 23, and 41 million cache lookups in the coarse, medium, and fine caches. There are 7,100, 3,300, and 14,000 cache misses, corresponding to hit rates of 99.97–99.99% and 6.2 million recomputed vertices. The run time is 62 minutes. Without caching, there would have been 35×$2^2$+23×$5^2$+41× $17^2$ million≈12 billion computed vertices—around 2000 times more than the 6.2 million vertices with caching.

Figure 11:
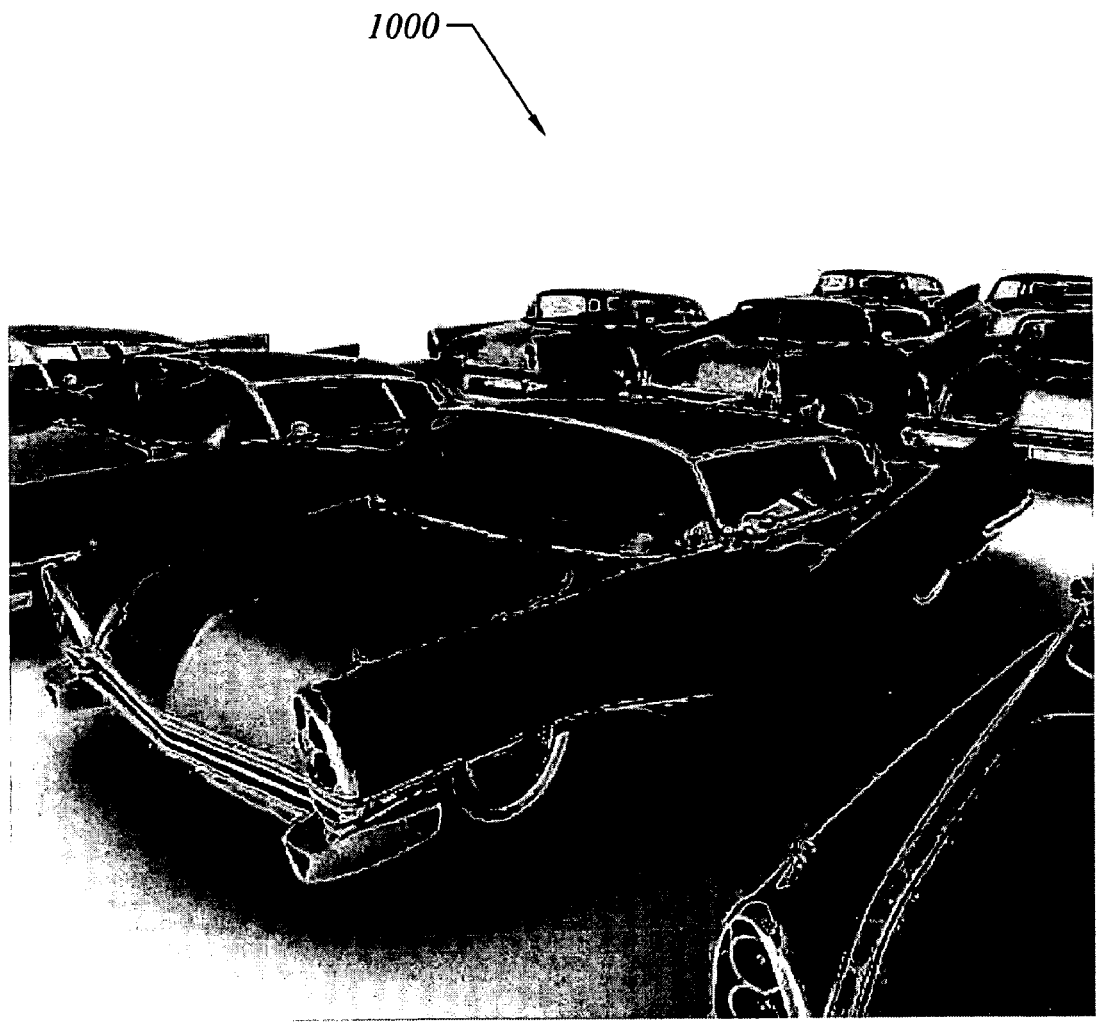
FIG. 11 is a simplified rendered image for a test scene according to another embodiment of the present invention.

FIG. 11 is a simplified rendered image for a test scene according to another embodiment of the present invention. This diagram is merely an example, which should not unduly limit the scope of the claims. One of ordinary skill in the art would recognize many variations, alternatives, and modifications. Test scene 1000 includes shiny cars on a ground plane shaded with purely ambient occlusion. This means that there is a mix of coherent and incoherent rays: 163 million occlusion rays, 4.1 million specular rays, and 3.6 million shadow rays. These rays cause 1.2 billion ray-patch intersection tests.

With a single-resolution cache, there are 650,000 cold tessellations for 190 million vertices, 1.2 billion cache lookups, and 30 million cache misses—corresponding to a hit rate of 97.5% and 8.7 billion recomputed vertices. The runtime is 32 hours. Without caching, the 1.2 billion intersection tests would cause the computation of 350 billion vertices.

When multiresolution caching is used, there are 730,000, 110,000, and 30,000 cold tessellations for 14 million vertices and 950 million, 190 million, and 120 million cache lookups, respectively. There are 1.6 million, 4,500, and 13,000 cache misses, corresponding to hit rates of 99.8–99.99% and a cost of 10 million recomputed vertices. This is only 0.11% of the 8.7 billion recomputed vertices for the single-resolution cache. The runtime is 11.5 hours. Without caching, the intersection tests would cause the computation of 43 billion vertices.

Figure 12:
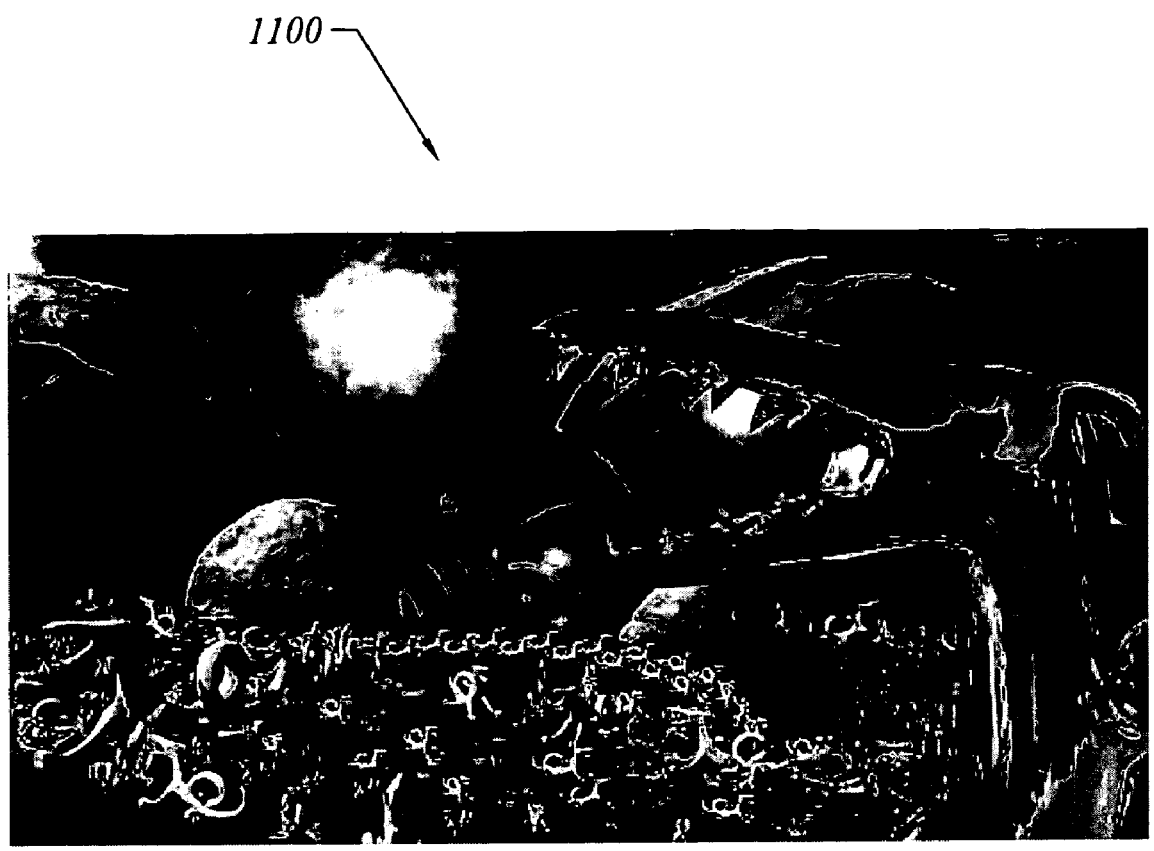
FIGS. 12 and 13 are simplified rendered images for test scenes according to yet another embodiment of the present invention.
Figure 13:
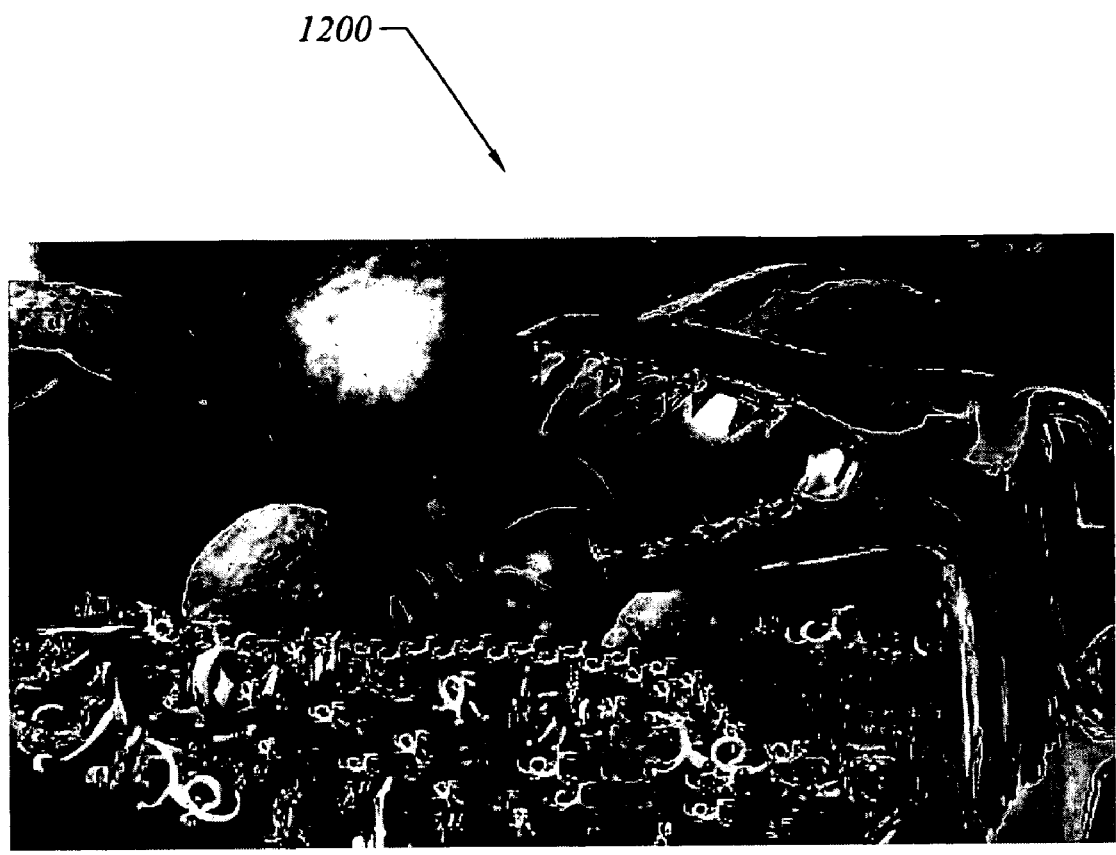

FIGS. 12 and 13 are simplified rendered images for test scenes according to yet another embodiment of the present invention. This diagram is merely an example, which should not unduly limit the scope of the claims. One of ordinary skill in the art would recognize many variations, alternatives, and modifications. Test scenes 1100 and 1200 each include 94 dragons modeled as subdivision surfaces. The dragons are modeled individually, not instanced. Behind them there are several procedurally displaced NURBS spheres. The scene includes 4,815 geometric primitives; these are subdivided during rendering into 183,000 patches. If fully tessellated, the scene would require 53 million vertices using 630 MB of memory and corresponding to 47 million quads or 94 million triangles. The textures in the scene are a mix of images and procedural textures. The scenes each are illuminated by a directional light source, and shadows are computed by ray tracing.

As shown in FIG. 12, half of the dragons are reflective chrome, half of them are matte. All specular reflection and shadow rays are coherent. With a single-resolution cache, the cache hit rate is 98.5%, and 140,000×$17^2$≈40 million vertices are recomputed due to cache misses. The run time is 21 minutes. With a multiresolution cache, the cache hit rates are 99.96–100%, and 0×$2^2$+1,200×$5^2$+250×$17^2$≈100,000 vertices are recomputed due to cache misses. The run time is 19 minutes. Even though all lookups are coherent, the multiresolution cache reduces the number of recomputed vertices by a factor of 400.

As shown in FIG. 13, half of the dragons are chrome, while the other half have a material that computes color bleeding, i.e., direct illumination plus single bounce soft indirect illumination. The color bleeding from the ground and sky onto the matte dragons is noticeable. The rum time with a 30 MB multiresolution cache is 2 hours 1 minute. With a single-resolution cache, there are 120,000 cold tessellations producing 35 million vertices and 18 million cache lookups. The cache capacity, cache misses, cache hit rate, and cache cost for varying cache sizes are listed in Table 1. "Mvtx" represents million vertices.

TABLE 1

| size | capacity | misses | hit rate | cost |
|---|---|---|---|---|
| 100 MB | 30k | 100k | 99.4% | 29 Mvtx |
| 30 MB | 9k | 350k | 98.0% | 100 Mvtx |
| 10 MB | 3k | 700k | 96.1% | 200 Mvtx |
| 3 MB | 900 | 1.2M | 93.3% | 350 Mvtx |
| 1 MB | 300 | 1.7M | 90.5% | 490 Mvtx |

With the multiresolution representation, there are 120,000, 40,000, and 7,500 cold tessellations producing 3.6 million vertices, and 6.0 million, 5.4 million, and 6.3 million lookups in the coarse, medium, and fine caches. The results for varying cache sizes are shown in Table 2. "Mvtx" again represents million vertices, and "kvtx" represents thousand vertices.

TABLE 2

| size | cap. | misses | hit rate | cost |
|---|---|---|---|---|
| 100 MB | 840k | 0 + 0 + 0 | 100% | 0 |
| 30 MB | 260k | 0 + 84 + 180 | 99.9–100% | 54 kvtx |
| 10 MB | 84k | 21k + 770 + 2.3k | 99.6–99.9% | 770 kvtx |
| 3 MB | 26k | 180k + 16k + 7.3k | 97.2–99.9% | 3.2 Mvtx |
| 1 MB | 8.4k | 470k + 39k + 20k | 92.7–99.7% | 8.6 Mvtx |

Comparison of Tables 1 and 2 reveals several interesting observations. For example, with a multiresolution geometry cache of only 1 MB, 8.6 million vertices are recomputed. This is significantly less than the number of vertices that are recomputed using a single-resolution cache, even if that cache uses 100 MB. With a multiresolution cache size of 3 MB, the cost of the cache misses of 3.2 million vertices is about the same as the cold tessellations of 3.6 million vertices. This means that the 3 MB cache performs well despite its small size. 3 MB is less than 1/200th of the 630 MB this scene would consume in fully tessellated form.

Figure 14:
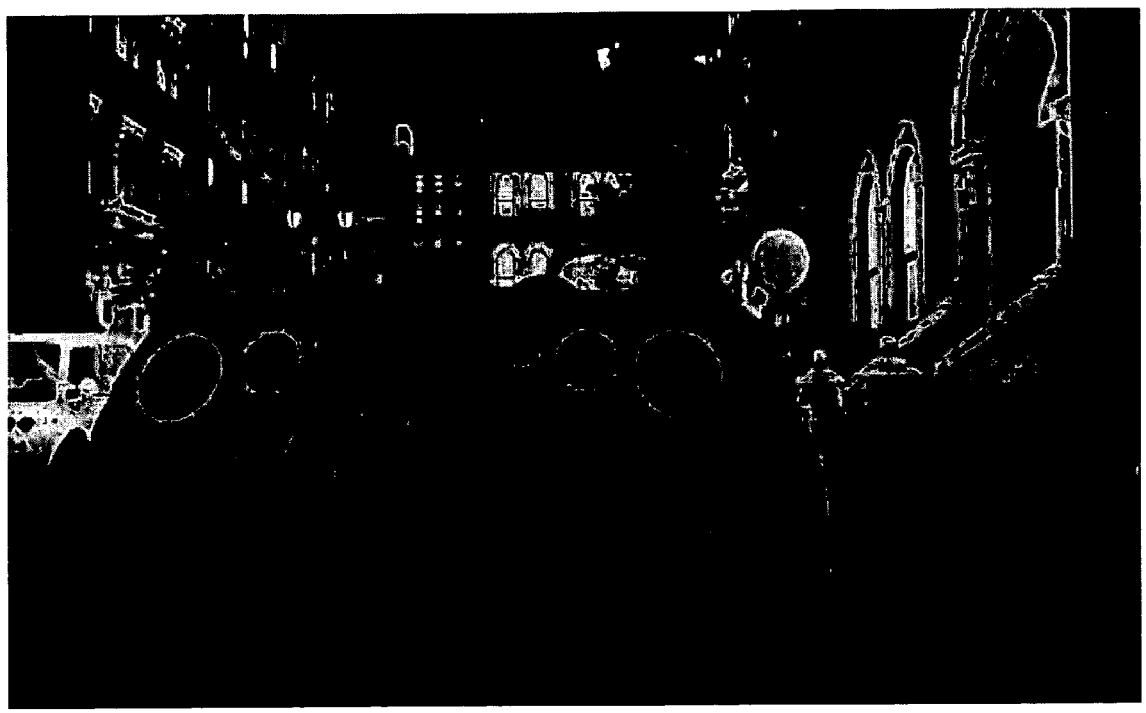
FIG. 14 is a simplified rendered image for a test scene according to yet another embodiment of the present invention.

FIG. 14 is a simplified rendered image for a test scene according to yet another embodiment of the present invention. This diagram is merely an example, which should not unduly limit the scope of the claims. One of ordinary skill in the art would recognize many variations, alternatives, and modifications. Scene 1300 is a city street modeled with NURBS surfaces and subdivision surfaces. The scene includes around 46,000 top-level primitives. During rendering, these primitives are divided into 970,000 patches. Fully tessellating the entire scene would give 280 million vertices using 3.4 GB of memory and corresponding to nearly 250 million quads or 500 million triangles. All objects are shaded with short-range ambient occlusion multiplied by surface color. The occlusion rays have a short cut-off distance. Computing the image as shown in FIG. 14 causes tracing of 210 million occlusion rays.

With a single-resolution cache, there are 710,000 cold tessellations, 1.1 billion cache lookups, and 2.1 million cache misses. This corresponds to a hit rate of 99.8% and 610 million recomputed vertices. With the multiresolution cache, there are 710,000, 300,000, and 93,000 cold tessellations and 300, 230, and 600 million lookups in the coarse, medium, and fine caches. There are 2,700, 6,500, and 29,000 cache misses, corresponding to hit rates above 99.99%. The cache misses cause re-computation of 8.6 million vertices— 71 times fewer than with the single-resolution cache. The run time is 7.1 hours. This test shows that even when occlusion rays are only traced over short distances and the accessed geometry is coherent, multiresolution tessellation and caching still pays off. For long-range ambient occlusion, where the rays intersect the geometry in a less coherent manner, the multiresolution cache would be even more beneficial.

According to an embodiment of the present invention, when rendering only directly visible objects, ray tracing a few levels of specular reflection from large, low-curvature surfaces, and ray tracing shadows from point-like light sources, the accessed geometry is coherent and a geometry cache performs well. But in many other cases, the accessed geometry is incoherent and a standard geometry cache performs poorly: ray tracing of specular reflection from highly curved surfaces, tracing rays that are many reflection levels deep, and distribution ray tracing for wide glossy reflection, global illumination, wide soft shadows, and ambient occlusion. Less geometric accuracy is usually necessary in the incoherent cases. This observation can be formalized by looking at the ray differentials for different types of scattering: coherent rays have small differentials, while incoherent rays have large differentials. This observation is utilized to obtain efficient multiresolution caching of geometry and textures including displacement maps for classic and distribution ray tracing in complex scenes. The multiresolution geometry caching scheme makes it possible to efficiently render scenes that, if fully tessellated, would use 100 times more memory than the geometry cache size.

According to another embodiment of the present invention, a computer program product including a computer-readable medium including instructions for rendering a plurality of objects is provided. The computer-readable medium includes one or more instructions for receiving ray differential information associated with a ray, one or more instructions for determining a resolution associated with a surface patch based on at least information associated with the ray and the surface patch, one or more instructions for generating a geometry representation based on at least information associated with the surface patch and the resolution, and one or more instructions for determining whether the ray and the surface patch intersect based on at least information associated with the ray and the geometry representation. The one or more instructions for determining a resolution includes one or more instructions for processing information associated with the ray and the surface patch, one or more instructions for determining a ray differential based on at least information associated with the ray and the surface patch, one or more instructions for processing information associated with the ray differential and the surface patch, and one or more instructions for determining the resolution based on at least information associated with the ray differential and the surface patch.

According to yet another embodiment of the present invention, a computer program product including a computer-readable medium including instructions for rendering a plurality of objects is provided. The computer-readable medium includes one or more instructions for receiving ray information associated with a ray, one or more instructions for determining a first resolution associated with a first surface patch based on at least information associated with the ray and the first surface patch, one or more instructions for processing information associated with the first resolution and a database, and one or more instructions for determining whether a first geometry representation associated with the first surface patch tessellated at the first resolution is present in the database. Additionally, the computer-readable medium includes one or more instructions for if the first geometry representation is not present, generating the first geometry representation based on at least information associated with the first surface patch and the first resolution, and one or more instructions for determining whether the ray and the first surface patch intersect based on at least information associated with the ray and the first geometry representation. The one or more instructions for determining a first resolution includes one or more instructions for processing information associated with the ray and the first surface patch, one or more instructions for determining a first ray differential based on at least information associated with the ray and the first surface patch, one or more instructions for processing information associated with the first ray differential and the first surface patch, and one or more instructions for determining the first resolution based on at least information associated with the first ray differential and the first surface patch.

According to yet another embodiment of the present invention, a system for rendering a plurality of objects, the system includes a processing system configured to receive ray differential information associated with a ray, determine a resolution associated with a surface patch based on at least information associated with the ray and the surface patch, generate a geometry representation based on at least information associated with the surface patch and the resolution, and determine whether the ray and the surface patch intersect based on at least information associated with the ray and the geometry representation. The determine a resolution includes process information associated with the ray and the surface patch, determine a ray differential based on at least information associated with the ray and the surface patch, process information associated with the ray differential and the surface patch, and determine the resolution based on at least information associated with the ray differential and the surface patch.

According to yet another embodiment of the present invention, a system for rendering a plurality of objects includes a processing system configured to receive ray information associated with a ray, determine a first resolution associated with a first surface patch based on at least information associated with the ray and the first surface patch, process information associated with the first resolution and a database, and determine whether a first geometry representation associated with the first surface patch tessellated at the first resolution is present in the database. Additionally, the processing system is configured to if the first geometry representation is not present, generate the first geometry representation based on at least information associated with the first surface patch and the first resolution. Moreover, the processing system is configured to determine whether the ray and the first surface patch intersect based on at least information associated with the ray and the first geometry representation. The determine a first resolution includes process information associated with the ray and the first surface patch, determine a first ray differential based on at least information associated with the ray and the first surface patch, process information associated with the first ray differential and the first surface patch, and determine the first resolution based on at least information associated with the first ray differential and the first surface patch.

The present invention has various advantages. Some advantages have been discussed above. Additionally, certain embodiments of the present invention use ray differentials to determine appropriate tessellation rates and levels of details for geometry representations, and use a multiresolution geometry cache to store the tessellated geometries for reuse. Some embodiments of the present invention provide efficient computation of ray tracing and global illumination in very complex scenes. For example, many geometries are generated and cached at appropriate resolutions and levels of details. Some embodiments of the present invention can handle very complex geometries and provide correct reflections and refractions, self-interreflections, shadows, and reduced manual setups. Certain embodiments of the present invention can avoid shader limitations resulting from ray reordering, and handle scenes more complex than the ray reordering technique. For example, a geometry can be tessellated even though the fine tessellation of such geometry takes up a memory 100 times larger than the geometry cache. Some embodiments of the present invention provide efficient distribution ray tracing in complex scenes. Distribution ray tracing is used at least by many global illumination methods such as the irradiance caching method of the Radiance program. Additionally, distribution ray tracing can be used for final gathering of photon maps, one-bounce global illumination, and ambient occlusion.

Certain embodiments of the present invention use the observation that coherent rays are often narrow and incoherent rays are often wide. By careful analysis of the requirements of a geometry cache, various benefits of tessellation are obtained. For example, such benefits include flexible displacement and speed without the excessive memory overhead. Very complex scenes can be rendered with ray tracing including both classic ray tracing for specular reflection, refraction, and sharp shadows and wide distribution ray tracing for global illumination and ambient occlusion. With a multiresolution geometry cache, scenes of nearly the same complexity as with pure REYES scanline rendering may be rendered. Some embodiments of the present invention provide a demand-driven caching technique which minimizes or reduces storage cost of the tessellation. Certain embodiments of the present invention provide efficient handling of displacement-mapped geometry. Computing displacement of a collection of surface points is often an expensive operation, but the efficiency of the multiresolution geometry cache ensures that such computation is only done when needed and at the desirable resolution and that the same displacement computation is rarely repeated. Certain embodiments of the present invention can shorten the movie turnaround time.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for rendering a plurality of objects, the method comprising:
receiving ray differential information associated with a ray;
determining a first resolution associated with a first surface patch based on at least information associated with the ray and the first surface patch;
processing information associated with the first resolution and a database;
determining whether a first geometry representation associated with the first surface patch tessellated at the first resolution is present in the database;
if the first geometry representation is not present, generating the first geometry representation based on at least information associated with the first surface patch and the first resolution;

determining whether the ray and the first surface patch intersect based on at least information associated with the ray and the first geometry representation;
wherein the determining a first resolution includes:
   processing information associated with the ray and the first surface patch;
   determining a first ray differential based on at least information associated with the ray and the first surface patch;
   processing information associated with the first ray differential and the first surface patch;
   determining the first resolution based on at least information associated with the first ray differential and the first surface patch;
wherein the database is associated with a plurality of predetermined resolutions, and the first resolution is equal to one of the plurality of predetermined resolutions;
wherein at least one of the plurality of predetermined resolutions includes a first tessellation rate associated with a first dimension and a second tessellation rate associated with a second dimension, the first tessellation rate being different from the second tessellation rate.

2. The method of claim 1 wherein the first surface patch is associated with a second resolution.

3. The method of claim 2 wherein the generating the first geometry representation based on at least information associated with the first surface patch and the first resolution comprises:
   if the first resolution is higher than the second resolution,
      determining the first geometry representation by tessellating the first surface patch at the second resolution;
      storing the first geometry representation into the database.

4. The method of claim 3 wherein the second resolution is used to render the first surface patch directly onto an image plane.

5. The method of claim 3 wherein the database is stored in a cache memory.

6. The method of claim 3 wherein the processing information associated with the ray and the first surface patch comprises:
   determining a bounding box surrounding the first surface patch;
   processing information associated with the bounding box;
   determining an intersection between the ray and the bounding box based on at least information associated with the ray and the bounding box.

7. The method of claim 6 wherein the ray is associated with an origin, the origin being located on a second surface patch, and the ray differential information includes a second ray differential associated with the origin.

8. The method of claim 7 wherein the determining a first ray differential comprises:
   determining a distance between the origin and the intersection;
   processing information associated with the distance and the second ray differential;
   determining the first ray differential based on at least information associated with the distance and the second ray differential.

9. The method of claim 8 wherein the determining the first resolution based on at least information associated with the first ray differential and the first surface patch comprises:
   determining a second resolution based on the first ray differential and the first surface patch;
   processing information associated with the second resolution and a plurality of predetermined resolutions;
   determining the first resolution based on at least information associated with the second resolution and the plurality of predetermined resolutions;
   wherein the first resolution is equal to one of the plurality of predetermined resolutions.

10. The method of claim 9 wherein the one of the plurality of predetermined resolutions is the nearest finer resolution to the second resolution among the plurality of predetermined resolutions.

11. The method of claim 10 wherein the determining whether the ray and the first surface patch intersect comprises:
   if the second resolution is not equal to the first resolution,
      obtaining a second geometry representation associated with another of the plurality of predetermined resolutions, the another of the plurality of predetermined resolutions is coarser than the second resolution;
      generating a third geometry representation based on at least information associated with the first geometry representation, the second geometry representation, the first resolution, the second resolution, and the another of the plurality of predetermined resolutions;
      determining whether the ray and the first surface patch intersect based on at least information associated with the ray and the third geometry representation.

12. The method of claim 11 wherein the generating a third geometry representation comprises interpolating between the first geometry representation and the second geometry representation.

13. The method of claim 3 wherein the generating the first geometry representation based on at least information associated with the first surface patch and the first resolution comprises:
   determining whether the first surface patch has been tessellated;
   if the first surface patch has not been tessellated,
      generating a second geometry representation based on at least information associated with the first surface patch and the second resolution;
      processing information associated with the second geometry representation, the first resolution, and the second resolution;
      determining the first geometry representation based on at least information associated with the second geometry representation, the first resolution, and the second resolution.

14. The method of claim 13, and further comprising:
   processing information associated with the second geometry representation;
   determining a bounding box corresponding to the first surface patch based on at least information associated with the second geometry representation.

15. The method of claim 3 wherein the generating the first geometry representation based on at least information associated with the first surface patch and the first resolution comprises:
   if the first surface patch is in motion,
      determining a start time and an end time;
      generating a second geometry representation based on at least information associated with the first surface patch and the first resolution, the second geometry representation corresponding to the start time;

generating a third geometry representation based on at least information associated with the first surface patch and the first resolution, the third geometry representation corresponding to the end time;

determining the first geometry representation based on at least information associated with the second geometry representation and the third geometry representation.

16. The method of claim 15 wherein the determining the first geometry representation based on at least information associated the second geometry representation and the third geometry representation comprises interpolating between the second geometry representation and the third geometry representation based on at least information associated with the start time and the end time.

17. The method of claim 16 wherein the generating the first geometry representation based on at least information associated with the first surface patch and the first resolution further comprises:

if the first surface patch is in motion,
storing the second geometry representation into the database;
storing the third geometry representation into the database.

18. The method of claim 3, and further comprising:
obtaining a second geometry representation associated with a second surface patch tessellated at a second resolution, the second surface patch being adjacent to the first surface patch;
processing information associated with the first geometry representation and the second geometry representation;
determining whether there is at least one patch crack between the first geometry representation and the second geometry representation;
if there is the at least one patch crack, performing a stitching process to the first geometry representation and the second geometry representation.

19. The method of claim 18 wherein the performing a stitching process includes moving at least one vertex.

20. The image formed according to the method of claim 3.

21. A computer program product including a computer-readable medium including instructions for rendering a plurality of objects, the computer-readable medium comprising:

one or more instructions for receiving ray differential information associated with a ray;
one or more instructions for determining a first resolution associated with a first surface patch based on at least information associated with the ray and the first surface patch;
one or more instructions for processing information associated with the first resolution and a database;
one or more instructions for determining whether a first geometry representation associated with the first surface patch tessellated at the first resolution is present in the database;
one or more instructions for if the first geometry representation is not present, generating the first geometry representation based on at least information associated with the first surface patch and the first resolution;
one or more instructions for determining whether the ray and the first surface patch intersect based on at least information associated with the ray and the first geometry representation;
wherein the one or more instructions for determining a first resolution includes:
one or more instructions for processing information associated with the ray and the first surface patch;
one or more instructions for determining a first ray differential based on at least information associated with the ray and the first surface patch;
one or more instructions for processing information associated with the first ray differential and the first surface patch;
one or more instructions for determining the first resolution based on at least information associated with the first ray differential and the first surface patch;
wherein the database is associated with a plurality of predetermined resolutions, and the first resolution is equal to one of the plurality of predetermined resolutions;
wherein at least one of the plurality of predetermined resolutions includes a first tessellation rate associated with a first dimension and a second tessellation rate associated with a second dimension, the first tessellation rate being different from the second tessellation rate.

22. The computer-readable medium of claim 21 wherein the first surface patch is associated with a second resolution.

23. The computer-readable medium of claim 22 wherein the one or more instructions for if the first geometry representation is not present, generating the first geometry representation based on at least information associated with the first surface patch and the first resolution comprises:

one or more instructions for if the first resolution is higher than the second resolution,
determining the first geometry representation by tessellating the first surface patch at the second resolution;
storing the first geometry representation into the database.

24. A system for rendering a plurality of objects, the system comprising:

a processing system configured to:
receive ray differential information associated with a ray;
determine a first resolution associated with a first surface patch based on at least information associated with the ray and the first surface patch;
process information associated with the first resolution and a database;
determine whether a first geometry representation associated with the first surface patch tessellated at the first resolution is present in the database;
if the first geometry representation is not present, generate the first geometry representation based on at least information associated with the first surface patch and the first resolution;
determine whether the ray and the first surface patch intersect based on at least information associated with the ray and the first geometry representation;
wherein the determine a first resolution includes:
process information associated with the ray and the first surface patch;
determine a first ray differential based on at least information associated with the ray and the first surface patch;
process information associated with the first ray differential and the first surface patch;
determine the first resolution based on at least information associated with the first ray differential and the first surface patch;

wherein the database is associated with a plurality of predetermined resolutions, and the first resolution is equal to one of the plurality of predetermined resolutions;
wherein at least one of the plurality of predetermined resolutions includes a first tessellation rate associated with a first dimension and a second tessellation rate associated with a second dimension, the first tessellation rate being different from the second tessellation rate.

25. The system of claim 24 wherein the first surface patch is associated with a second resolution.

26. The system of claim 25 wherein the generate the first geometry representation based on at least information associated with the first surface patch and the first resolution comprises:
if the first resolution is higher than the second resolution, determine the first geometry representation by tessellating the first surface patch at the second resolution;
store the first geometry representation into the database.

27. A method for rendering a plurality of objects, the method comprising:
receiving ray differential information associated with a ray;
determining a first resolution associated with a first surface patch based on at least information associated with the ray and the first surface patch;
processing information associated with the first resolution and a database;
determining whether a first geometry representation associated with the first surface patch tessellated at the first resolution is present in the database;
if the first geometry representation is not present, generating the first geometry representation based on at least information associated with the first surface patch and the first resolution;
determining whether the ray and the first surface patch intersect based on at least information associated with the ray and the first geometry representation;
wherein the determining a first resolution includes:
processing information associated with the ray and the first surface patch;
determining a first ray differential based on at least information associated with the ray and the first surface patch;
processing information associated with the first ray differential and the first surface patch;
determining the first resolution based on at least information associated with the first ray differential and the first surface patch;
wherein the first surface patch is associated with a second resolution;
wherein the generating the first geometry representation based on at least information associated with the first surface patch and the first resolution includes:
if the first resolution is higher than the second resolution,
determining the first geometry representation by tessellating the first surface patch at the second resolution;
storing the first geometry representation into the database.

28. The image formed according to the method of claim 27.

29. A computer program product including a computer-readable medium including instructions for rendering a plurality of objects, the computer-readable medium comprising:
one or more instructions for receiving ray differential information associated with a ray;
one or more instructions for determining a first resolution associated with a first surface patch based on at least information associated with the ray and the first surface patch;
one or more instructions for processing information associated with the first resolution and a database;
one or more instructions for determining whether a first geometry representation associated with the first surface patch tessellated at the first resolution is present in the database;
one or more instructions for if the first geometry representation is not present, generating the first geometry representation based on at least information associated with the first surface patch and the first resolution;
one or more instructions for determining whether the ray and the first surface patch intersect based on at least information associated with the ray and the first geometry representation;
wherein the one or more instructions for determining a first resolution includes:
one or more instructions for processing information associated with the ray and the first surface patch;
one or more instructions for determining a first ray differential based on at least information associated with the ray and the first surface patch;
one or more instructions for processing information associated with the first ray differential and the first surface patch;
one or more instructions for determining the first resolution based on at least information associated with the first ray differential and the first surface patch;
wherein the first surface patch is associated with a second resolution;
wherein the one or more instructions for if the first geometry representation is not present, generating the first geometry representation based on at least information associated with the first surface patch and the first resolution includes:
one or more instructions for if the first resolution is higher than the second resolution,
determining the first geometry representation by tessellating the first surface patch at the second resolution;
storing the first geometry representation into the database.

30. A system for rendering a plurality of objects, the system comprising:
a processing system configured to:
receive ray differential information associated with a ray;
determine a first resolution associated with a first surface patch based on at least information associated with the ray and the first surface patch;
process information associated with the first resolution and a database;
determine whether a first geometry representation associated with the first surface patch tessellated at the first resolution is present in the database;
if the first geometry representation is not present, generate the first geometry representation based on at least information associated with the first surface patch and the first resolution;
determine whether the ray and the first surface patch intersect based on at least information associated with the ray and the first geometry representation;
wherein the determine a first resolution includes:
  process information associated with the ray and the first surface patch;
  determine a first ray differential based on at least information associated with the ray and the first surface patch;
  process information associated with the first ray differential and the first surface patch;
  determine the first resolution based on at least information associated with the first ray differential and the first surface patch;
wherein the first surface patch is associated with a second resolution;
wherein the generate the first geometry representation based on at least information associated with the first surface patch and the first resolution includes:
  if the first resolution is higher than the second resolution,
    determine the first geometry representation by tessellating the first surface patch at the second resolution;
    store the first geometry representation into the database.

* * * * *